United States Patent
Wu et al.

(10) Patent No.: US 11,297,604 B2
(45) Date of Patent: Apr. 5, 2022

(54) METHODS AND DEVICES OF ASSIGNING RESOURCE FOR SIDELINK COMMUNICATION SYSTEM

(71) Applicant: Samsung Electronics Co., Ltd., Suwon-si (KR)

(72) Inventors: Min Wu, Beijing (CN); Feifei Sun, Beijing (CN); Miao Zhou, Beijing (CN); Yi Wang, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 55 days.

(21) Appl. No.: 16/780,180

(22) Filed: Feb. 3, 2020

(65) Prior Publication Data

US 2020/0252910 A1   Aug. 6, 2020

(30) Foreign Application Priority Data

Feb. 1, 2019   (CN) .......................... 201910105844.5

(51) Int. Cl.
*H04W 72/04* (2009.01)
*H04B 17/318* (2015.01)
*H04W 74/08* (2009.01)
*H04L 5/00* (2006.01)
*H04W 72/02* (2009.01)

(52) U.S. Cl.
CPC .......... *H04W 72/04* (2013.01); *H04B 17/318* (2015.01); *H04L 5/0055* (2013.01); *H04W 72/02* (2013.01); *H04W 74/0808* (2013.01)

(58) Field of Classification Search
CPC .... H04L 5/0055; H04L 5/0023; H04W 72/04; H04W 72/0446; H04W 72/02
See application file for complete search history.

(56) References Cited

U.S. PATENT DOCUMENTS

2018/0098322 A1    4/2018  Yoon
2018/0249428 A1*   8/2018  Huang ................ H04W 52/365
(Continued)

FOREIGN PATENT DOCUMENTS

WO    2017/150956 A1    9/2017
WO    2018/174610 A1    9/2018
(Continued)

OTHER PUBLICATIONS

Intel Corporation; Sidelink Resource Allocation Schemes for NR V2X Communication; 3GPP TSG RAN WG1 Ad-Hoc Meeting 1901; R1-1900483; Jan. 21-25, 2019; Taipei, Taiwan.
(Continued)

Primary Examiner — Raj Jain
(74) Attorney, Agent, or Firm — Jefferson IP Law, LLP

(57) ABSTRACT

A resource assignment method performed by a user equipment (UE) is provided. The resource assignment method includes determining a target resource set for data transmission at a first time unit, selecting the earliest resource in time from the target resource set, wherein the selected resource is located at a second time unit, determining, at the second time unit and/or between the first time unit and the second time unit, whether the selected resource at the second time unit is available, and determining whether data is transmitted on the selected resource at the second time unit based on the result of the determination.

15 Claims, 11 Drawing Sheets

(56) References Cited

U.S. PATENT DOCUMENTS

| | | | |
|---|---|---|---|
| 2019/0036664 A1* | 1/2019 | Liu | H04L 5/0048 |
| 2019/0357184 A1* | 11/2019 | Tang | H04J 11/0083 |
| 2019/0394786 A1 | 12/2019 | Parron et al. | |
| 2020/0015090 A1* | 1/2020 | Feng | H04L 5/0055 |
| 2020/0068566 A1* | 2/2020 | Gao | H04L 5/00 |
| 2020/0068609 A1 | 2/2020 | Wang et al. | |
| 2020/0196296 A1* | 6/2020 | Byun | H04W 36/0072 |
| 2020/0252910 A1* | 8/2020 | Wu | H04B 17/318 |
| 2020/0296691 A1 | 9/2020 | Lee et al. | |

FOREIGN PATENT DOCUMENTS

| | | |
|---|---|---|
| WO | 2018/174630 A1 | 9/2018 |
| WO | 2018/175553 A1 | 9/2018 |
| WO | 2018/201784 A1 | 11/2018 |

OTHER PUBLICATIONS

Vivo; Discussion on resource allocation mechanism for NR V2X; 3GPP TSG RAN WG1 Ad-Hoc Meeting 1901; R1-1900120; Jan. 21-25, 2019; Taipei.

Interdigital Inc.; Mode 2a and Mode 2d for NR V2X Resource Allocation; 3GPP RAN WG1 Meeting AH 1901; R1-1900769; Jan. 21-25, 2019; Taipei, Taiwan.

International Search Report with Written Opinion dated May 11, 2020; International Appln. No. PCT/KR2020/001582.

Extended European Search Report dated Feb. 3, 2022, issued in European Patent Application No. 20747848.8.

* cited by examiner

METHODS AND DEVICES OF ASSIGNING RESOURCE FOR SIDELINK COMMUNICATION SYSTEM

CROSS-REFERENCE TO RELATED APPLICATION(S)

This application is based on and claims priority under 35 U.S.C. § 119(a) of a Chinese patent application number 201910105844.5, filed on Feb. 1, 2019, in the Chinese Intellectual Property Office, the disclosure of which is incorporated by reference herein in its entirety.

BACKGROUND

1. Field

The disclosure relates to the field of communication technology. More particularly, the disclosure relates to methods and devices of assigning resource for a sidelink communication system.

2. Description of Related Art

In a Long Term Evolution (LTE)-based Vehicle to Everything (V2X) system of the 3GPP standardization organization, a User Equipment (UE) first sends a Physical Sidelink Control Channel (PSCCH) to indicate information such as time-frequency resources occupied by a data channel scheduled by the PSCCH and a Modulation and Coding Scheme (MCS), and the UE then transmits data on the data channel. For a LTE-based device to device (D2D)/V2X system, the above-mentioned Scheduling Assignment (SA) is also referred to as PSCCH, and the data channel is also referred to as Physical Sidelink Shared Channel (PSSCH). Assignment granularity of frequency resources is a sub-channel, and one sub-channel includes some continuous physical resource blocks (PRBs), wherein the number of PRBs is configured by a high-level signaling. Resources for a device may occupy one or more continuous sub-channels.

For a UE, since data for the UE is generated periodically in a period of time, the UE may periodically reserve resources at a certain reserved interval, and each data may be sent K times repeatedly, and K resources need to be reserved correspondingly (K is greater than or equal to 1), so as to avoid a situation that some devices are unable to receive this data due to limitations of half-duplex operations.

In a Transmission Mode 4 of the LTE V2X, a LTE V2X UE selects resources based on an autonomous method. According to information detected in a detection window, the UE may select K resources it may be occupy, and continuously reserve them for C periods. A method for detecting resources is to obtain the PSSCH scheduled by the PSCCH for the UE based on decoding of PSCCHs of other UEs, so that a Received Power of the UE (for example, a physical sidelink shared channel-reference signal Received Power (RSRP)) may be measured, thereby determining resource occupancy and/or reservation based on the above Received Power and the reserved interval in the PSCCH. Another method for detecting resources is to determine resource occupancy and/or reservation based on a received energy (for example, a Sidelink-Receive Signal Strength Indicator (S-RSSI)), and for a resource on a sub-frame x within a selected window, the above received energy refers to an average value of received energies for the same sub-channel resources on a sub-frame $x-P_{rsvp} \cdot j$ in the detection window, wherein $P_{rsvp}$ is a reserved interval, and j is an arbitrary integer, for example. Using the above two detection methods, the UE can avoid using the same resources as other devices for transmission.

FIG. 1 illustrates an example flowchart of an autonomous resource assignment method for a LTE V2X UE according to the related art.

It is assumed that the resource selection is performed in a subframe n, a reserved interval for the current reserved resources of the UE is $P_A$. The UE may select resources within a selected window $[n+T_1, n+T_2]$ and continuously reserve them for C periods at the interval $P_A$. $T_1$ and $T_2$ depend on the implementations of UE, for example, $T_1 \leq 4$, $20 \leq T_2 \leq 100$. $T_1$ depends on a processing latency of the UE from the time at which resources are selected to the time at which the SA signaling and data may be sent, and $T_2$ mainly depends on latency characteristics that the current traffic may tolerate. In FIG. 1, firstly, all of the resources within the selected window are set in a set $S_A$ at operation 101. Next, according to the correctly decoded SA, if SA indicates that resources are still reserved after the subframe n, the Received Power of the data channel scheduled by SA is measured, and when the Received Power exceeds a corresponding threshold Th1, a part of candidate resources of $S_A$ are excluded at operation 102. Specifically, when the Received Power exceeds the corresponding threshold Th1, the resources Y reserved after the subframe n are unavailable according to SA. The above threshold Th1 may be jointly determined according to a priority of the device performing the resource selection and a priority indicated by the correctly decoded SA. Let $R_{x,y}$ represent a single sub-frame resource in the selection window $[n+R_1, n+T_2]$, and $R_{x,y}$ is located at sub-frame y, and contains one or more continuous sub-channels starting from the sub-channel x, when the PRB for the $R_{x,y+j \cdot P_A}$ overlaps with the PRB of the resource Y, $R_{x,y}$ is not available for a device A, that is, $R_{x,y}$ is excluded from the set $S_A$, where j=0, 1, ... C−1, and C is the number of periods for which the device A currently needs to reserve resources at the interval $P_A$. Next, determining whether the ratio of the remaining resources in $S_A$ to the total resources of $S_A$ is greater than R, for example, R=20% at operation 103. If the ratio is less than R, the threshold Th1 is raised by 3 dB at operation 104, and the process returns to operation 101, otherwise, the process proceeds to operation 105. At operation 105, received energies of the remaining resources in $S_A$ are estimated, and a resource with the smallest received energy is moved to the set $S_B$ until the ratio of the total resources of $S_B$ to the total resources of $S_A$ is R. For a resource containing multiple sub-channels, the received energy of this resource is the average of the received energies of each sub-channel which is contained in the resource. Next, resource for data transmission is selected from the resources in $S_B$ at operation 106 and data is transmitted on the selected resource at operation 107. Here, when one data is transmitted twice, the UE firstly selects one resource for data transmission from $S_B$, and then, if there is available resource which satisfies latency requirements and is within an indication range of the SA, the UE selects another one resource for data transmission.

In the LTE V2X system, for the method of selecting resource based on detection information, after the UE selects and reserves the resource, the number of times the UE may transmit data using the resource is recorded as S, where S is a random number. When the number of times the UE may transmit data using the resource equal to S, the resource selection of the UE may be triggered again. In addition, resource selection may also be triggered in some other cases. For example, assuming that the UE fails to transmit data on continuous N reserved resources, or the UE fails to transmit data within a time unit of which length is t, the UE triggers resource re-selection.

Compared with the LTE V2X system, the NR V2X system may support a more complex service model, for example, the data of the UE may be non-periodic, in the resource assignment method autonomously performed by UE under a direct communication PC5 interface, the UE only uses the selected resource one time, and does not periodically reserve the resource at an interval. Therefore, the above method for determining whether the reserved resources Y after the subframe n are available according to the SA may not be applicable, and how to design the resource assignment method autonomously performed by UE under the direct communication PC5 interface of the NR V2X system is an urgent problem to be solved.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide methods and devices of assigning resource for a sidelink communication system.

Additional aspects will be set forth in part in the description which follows and, in part, will be apparent from the description, or may be learned by practice of the presented embodiments.

In accordance with an aspect of the disclosure, a resource assignment method performed by a user equipment (UE) is provided. The resource assignment method includes determining a target resource set for data transmission at a first time unit, selecting the earliest resource in time from the target resource set, wherein the selected resource is located at a second time unit, determining, at the second time unit and/or between the first time unit and the second time unit, whether the selected resource at the second time unit is available, and determining whether data is transmitted on the selected resource at the second time unit based on the result of the determination.

According to some embodiments, the resource assignment method may further comprise when the selected resource at the second time unit is determined to be available, transmitting data on the selected resource at the second time unit, when the selected resource at the second time unit is determined to be unavailable, performing the following operations determining whether there is remaining resource in the target resource set, if there is no remaining resource in the target resource set, data is still transmitted on the selected resource at the second time unit. The resource assignment method may further comprise if there is remaining resource in the target resource set, performing the following operations selecting the earliest resource in time from the remaining resource in the target resource set, wherein the selected resource is located at a third time unit, determining, at the third time unit and/or between the second time unit and the third time unit, whether the selected resource at the third time unit is available. The resource assignment method may further comprise when the selected resource at the third time unit is determined to be available, transmitting data on the selected resource at the third time unit, when the selected resource at the third time unit is determined to be unavailable, continuously selecting the earliest resource in time from the other remaining resources in the target resource set and determining the availability of the selected resource, until an available resource is determined or until there is no other remaining resource in the target resource set, and when there is no other remaining resource in the target resource set, transmitting the data on the last resource in time in the target resource set.

In some embodiments, determining the target resource set for data transmission may comprise determining an initial resource set available for data transmission and excluding some resources from the initial resource set according to at least one of the followings excluding resources based on a correctly decoded Scheduling Assignment (SA) signaling, wherein when a Reference Signal Received Power (RSRP) measured based on a physical channel scheduled by the SA signaling is greater than a predetermined first threshold, and a reserved resource indicated by the SA signaling collides with or is about to collide with a resource in the initial resource set, the resource which has or is about to have a collision is excluded from the initial resource set, excluding resources based on a correctly decoded Resource Reservation Signaling (RRS), wherein when a RSRP measured based on a physical channel carrying the RRS or a physical signal transmitting the RRS is greater than a predetermined second threshold, and a reserved resource indicated by the RRS collides with or is about to collide with a resource in the initial resource set, the resource which has or is about to have a collision is excluded from the initial resource set, excluding resources based on an average received signal strength indicator RSSI of a resource measured within a predefined time window, wherein a resource which has an average RSSI greater than a predetermined third threshold is excluded from the initial resource set. Determining the target resource set for data transmission may further comprises determining the number of remaining resources in the initial resource set after excluding some resources, when the number of remaining resources after excluding some resources is less than a predetermined minimum value, increasing at least one of the first threshold, the second threshold, and the third threshold, and re-performing the operation of excluding some resources from the initial resource set based on at least one of the increased first threshold, the increased second threshold, and the increased third threshold, until the number of remaining resources after excluding some resources is greater than or equal to the predetermined minimum value, ordering the remaining resources of which the number is greater than or equal to the predetermined minimum value in ascending order of time, and selecting the first preset number of resources or all resources from the ordered remaining resources to form the target resource set.

In some embodiments, the predetermined minimum value may be determined according to at least one of the followings a size of the initial resource set, a size of data to be transmitted by the UE, the maximum number of retransmissions of data transmission of the UE, and a priority of data traffic of the UE.

In some embodiments, ordering the remaining resources of which the number is greater than or equal to the predetermined minimum value in an order of time may comprises randomly ordering multiple resources at the same time unit, or ordering the multiple resources based on frequency domain position.

In some embodiments, whether the selected resource at the second time unit is available may be determined by at least one of the followings determining, at the second time unit, whether the selected resource at the second time unit is available based on a Listen Before Talk (LBT) criterion, determining whether the selected resource at the second time unit is available based on the scheduling assignment (SA) signaling that is correctly decoded between the first time unit and the second time unit, determining whether the selected resource at the second time unit is available based on the Resource Reservation Signaling (RRS) that is correctly decoded between the first time unit and the second time unit.

In some embodiments, determining whether the selected resource at the second time unit is available based on the Listen Before Talk (LBT) criterion may comprises determining whether each of Received Signal Strength Indicators (RSSIs) at a first predefined number of time durations within the selected resource at the second time unit is less than a predetermined fourth threshold, and if so, determining that the selected resource at the second time unit is available, and transmitting data on remaining time of the selected resource at the second time unit, otherwise, determining that the selected resource at the second time unit is unavailable. In some embodiments, determining whether the selected resource at the second time unit is available based on the scheduling assignment (SA) signaling that is correctly decoded between the first time unit and the second time unit may comprises for each correctly decoded SA, when the Reference Signal Received Power (RSRP) measured based on the physical channel scheduled by the correctly decoded SA signaling is greater than a predetermined fifth threshold, and the reserved resource indicated by the corresponding correctly decoded SA collides with or is about to collide with the selected resource at the second time unit, determining that the selected resource at the second time unit is unavailable. In some embodiments, determining whether the selected resource at the second time unit is available based on the Resource Reservation Signaling (RRS) that is correctly decoded between the first time unit and the second time unit may comprises for each correctly decoded RRS, when the Reference Signal Received Power (RSRP) measured based on the physical channel or the physical signal carrying the corresponding correctly decoded RRS is greater than a predetermined sixth threshold, and the reserved resource indicated by the corresponding correctly decoded RRS collides with or is about to collide with the selected resource at the second time unit, determining that the selected resource at the second time unit is unavailable.

In some embodiments, when there are multiple resources at the second time unit in the target resource set, determining whether the selected resource at the second time unit is available may comprises determining whether the multiple resources at the second time unit are available, and when more than one resources at the second time unit are determined to be available, transmitting data on any of the more than one resources.

In some embodiments, the resource assignment method may further comprise before determining whether the selected resource at the second time unit is available determining whether the UE has transmitted a Resource Reservation Signaling (RRS) to indicate in advance that the selected resource at the second time unit from the target resource set is reserved by the UE, and when the selected resource at the second time unit from the target resource set is indicated in advance to be reserved by the UE, transmitting data on the selected resource at the second time unit, when the selected resource at the second time unit from the target resource set is not indicated in advance to be reserved by the UE, determining whether the selected resource at the second time unit is available.

In some embodiments, the situations that the UE does not transmit the RRS to indicate in advance that the selected resource at the second time unit from the target resource set is reserved by the UE comprises at least one of there is no enough time for the UE to transmit the RRS in a corresponding time interval, there is no available resource for the UE to transmit the RRS in a corresponding time interval, the UE needs not no to transmit the RRS based on a priority of the UE and/or a priority of the data traffic, the UE is not configured with a mode for transmitting the RRS by a base station.

In some embodiments, the RRS may indicate that one or more resources within a predefined time window after the RRS are reserved using any one of the following manners indicating information of time domain and frequency domain positions of the reserved resources, only indicating information of time domain position of the reserved resource, wherein information of frequency domain position of the reserved resource is determined by frequency domain position of the RRS, only indicating information of frequency domain position of the reserved resource, wherein information of time domain position of the reserved resource is determined by time domain position of the RRS, and determining frequency domain position of the reserved resource based on frequency domain position of the RRS, ad determining time domain position of the reserved resource based on time domain position of the RRS.

In some embodiments, resources for transmitting the RRS and resources for transmitting data are located in different resource pools.

In some embodiments, the resource assignment method may further comprise after transmitting data on the available resource determined from the target resource set, when there are remaining resources in the target resource set, determining an available resource from the remaining resources for data retransmission.

In some embodiments, a resource in the target resource set may comprises, in time domain and/or frequency domain, a plurality of continuous resource grids, and each resource grid is composed of one or more resource blocks within one time unit, wherein the one or more resource blocks are continuous in the frequency domain.

In some embodiments, the resource assignment method may further comprise when a resource available for transmitting data comprises a plurality of time units in time domain, transmitting data on the resource in any one of the following manners repeatedly transmitting data on the plurality of time units, and performing rate matching on the data based on the plurality of time units.

In accordance with another aspect of the disclosure, a user equipment (UE) is provided. The user equipment includes a processing module, the processing module being configured to determining a target resource set for data transmission at a first time unit, selecting the earliest resource in time from the target resource set, wherein the selected resource is located at a second time unit, determining, at the second time unit and/or between the first time unit and the second time unit, whether the selected resource at the second time unit is available, and determining whether data is transmitted on the selected resource at the second time unit based on the result of the determination.

In accordance with another aspect of the disclosure, a user equipment (UE) is provided. The UE comprises a receiving module, configured to receive signaling transmitted by other UEs for indicating reserved resources of the other UEs, a processing module, configured to determining, based on the received signaling, a target resource set for data transmission at a first time unit, selecting the earliest resource in time from the target resource set, wherein the selected resource is located at a second time unit, determining, at the second time unit and/or between the first time unit and the second time unit, whether the selected resource at the second time unit is available, and determining whether data is transmitted on the selected resource at the second time unit based on the result of the determination.

In accordance with another aspect of the disclosure, a user equipment (UE) is provided. The UE includes a transmitting module, configured to transmit signaling for indicating reserved resources of the UE to other UEs, a receiving module, configured to receive signaling transmitted by other UEs for indicating reserved resources of the other UEs, a processing module, configured to determining, based on the received signaling, a target resource set for data transmission at a first time unit, selecting the earliest resource in time from the target resource set, wherein the selected resource is located at a second time unit, determining, at the second time unit and/or between the first time unit and the second time unit, whether the selected resource at the second time unit is available, and determining whether data is transmitted on the selected resource at the second time unit based on the result of the determination.

In accordance with another aspect of the disclosure, a user equipment (UE) is provided. The UE includes a processor, and a memory, configured to store machine readable instructions that, when executed by the processor, cause the processor to perform the method according to the method of the first aspect.

In accordance with another aspect of the disclosure a computer readable storage medium having stored thereon computer executable instructions that, when executed by a processor of a user equipment UE, cause the UE to perform the method according to the first aspect is provided.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
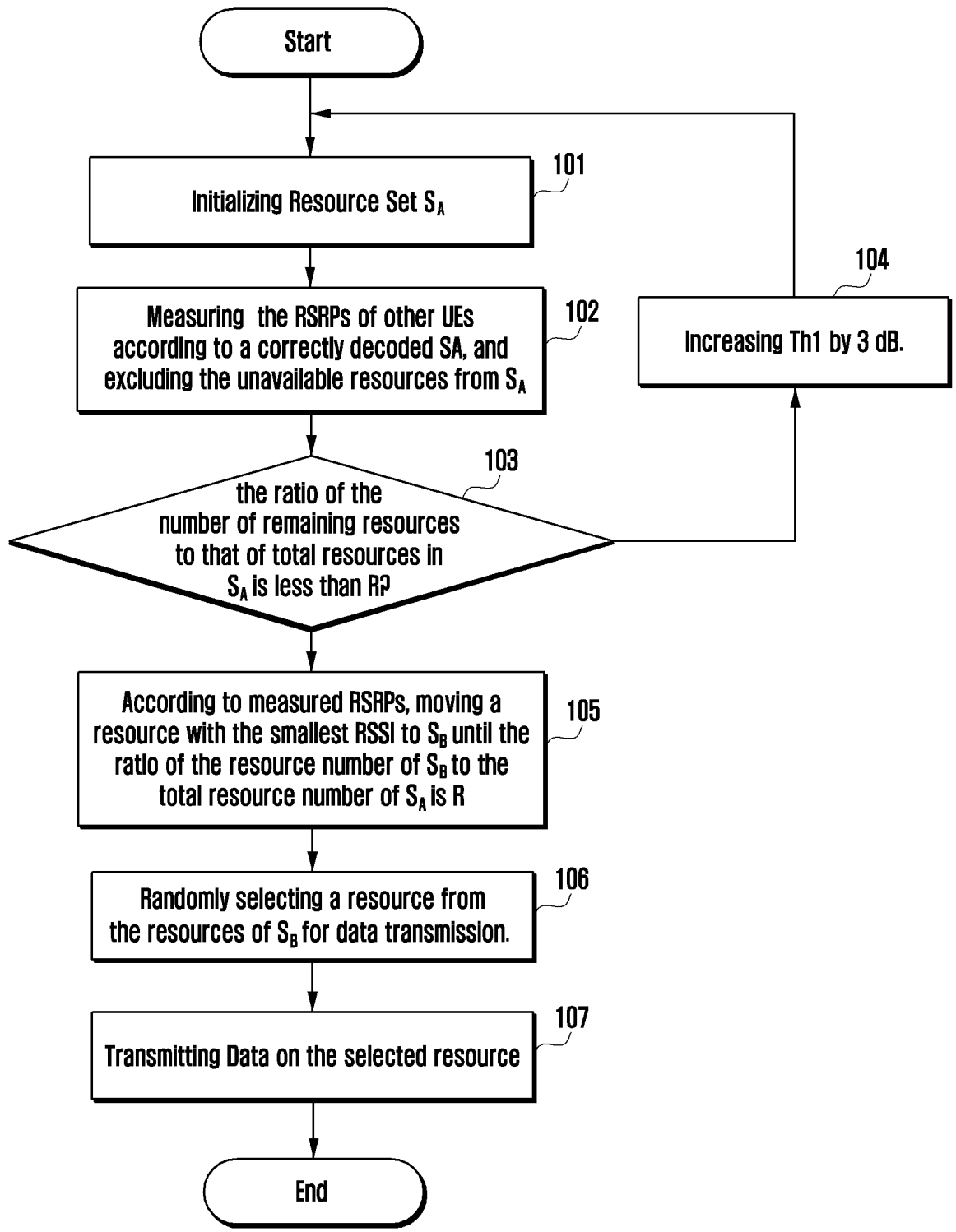
FIG. 1 illustrates an example flowchart of an autonomous resource assignment method for a Long Term Evolution (LTE) Vehicle to Everything (V2X) user equipment (UE) according to the related art.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

It should be further understood that the phrase "comprise/include", as used in the specification of the disclosure, specify the presence of stated features, integers, steps, operations, elements, and/or components and the like, but do not preclude the presence or addition of one or more other features, integers, steps, operations, elements, components and/or combinations thereof. It will be understood that when an element is referred to as being "connected" or "coupled" to another element, it can be directly connected or coupled to the other element, or there may be an intermediate element therebetween. In addition, "connected" or "coupled" as used herein may include either a wireless connection or a wireless coupling. The phrase "and/or" as used herein includes all or any one and all combinations of one or more of the associated listed items.

Those skilled in the art will appreciate that all terms (including technical and scientific terms) as used herein have the same meaning as commonly understood by one of ordinary skill in the art to which the disclosure belongs, unless otherwise defined. It will be understood that the terms such as those defined in the general dictionary should be understood to have a meaning consistent with the meaning in the context of the prior art, and should not be explained in an idealized or overly formal meaning, unless otherwise defined.

Those skilled in the art should understand that the "terminal" and "terminal device" as used herein include both a wireless signal receiver device, which is only capable of wireless transmission, and a receiving and transmitting hardware device, which is capable of two-way communication over a two-way communication link. Such devices may include: a cellular or other communication device, which includes a single line display or a multi-line display or no multi-line display; a Personal Communications Service (PCS), which may combine voice, data processing, fax, and/or data communication capabilities; a Personal Digital Assistant (PDA), which may include radio frequency receivers, pagers, Internet/Intranet access, web browsers, notepads, calendars, and/or Global Positioning System (GPS) receivers; a laptop and/or palmtop computer or other device of the related art, which may have and/or include a radio frequency receiver. The "terminal", "terminal device" as used herein may be portable, transportable, installed in a vehicle (such as, in air, in water and/or on ground), or may be adapted and/or configured to operate locally, and/or may operate at any other location on the Earth and/or in the space in a distributed form. The "terminal" and "terminal device" as used herein may also be a communication terminal, an internet terminal, a music/video playing terminal which, for example, may be a PDA, a Mobile Internet Device (MID), and/or a mobile phone capable of playing a music/video, and may also be a smart TV, a set-top box and the like.

According to the above description, the resource assignment method autonomously performed by UE implements the resource assignment based on SA. However, in some cases, the method for determining whether the reserved resource is available based on SA may not be applicable. In addition, even if the resource for data transmission is selected, if the availability of the selected resource is not determined before using the selected resource, the selected resource may still collide with resources of other UEs, which may reduce the reliability of data transmission.

Therefore, the disclosure provides an autonomous resource assignment method for a UE, which may not only determine a target resource set for data transmission, but also determine the availability of the resources selected from the target resource set before transmitting data on the selected resources, thereby reducing the possibility of resource collision and improving the quality of data transmission.

In some embodiments, a method of introducing Resource Reservation Signaling (RRS) in a direct communication PC5 interface of a sidelink communication system is described, the method may include: after determining Physical Sidelink Shared Channel (PSSCH) resources for a PSSCH transmission and before performing the PSSCH transmission on the determined PSSCH resources, transmitting, by a first UE, the RRS to indicate the determined PSSCH resource; receiving, by a second UE, the RRS transmitted by the first UE to assist the second UE in determining PSSCH resources. Here, "determining" may also be referred to as "reserving" or "predetermining".

In this embodiment, the RRS is substantially different from the scheduling assignment signaling of the existing LTE V2X system in that, (1) the RRS includes only the indication information for the PSSCH resources determined by the first UE, and the SA may include other detailed scheduling information for the PSSCH transmission performed by the first UE on the determined PSSCH resource in addition to information for the PSSCH resource determined by the first UE, for example, information such as a Modulation and Coding Scheme (MCS); (2) the RRS is transmitted prior to the PSSCH, and the PSCCH carrying the SA and the PSSCH are transmitted simultaneously, that is, the PSCCH and the PSSCH are transmitted in the same subframe.

Figure 2:
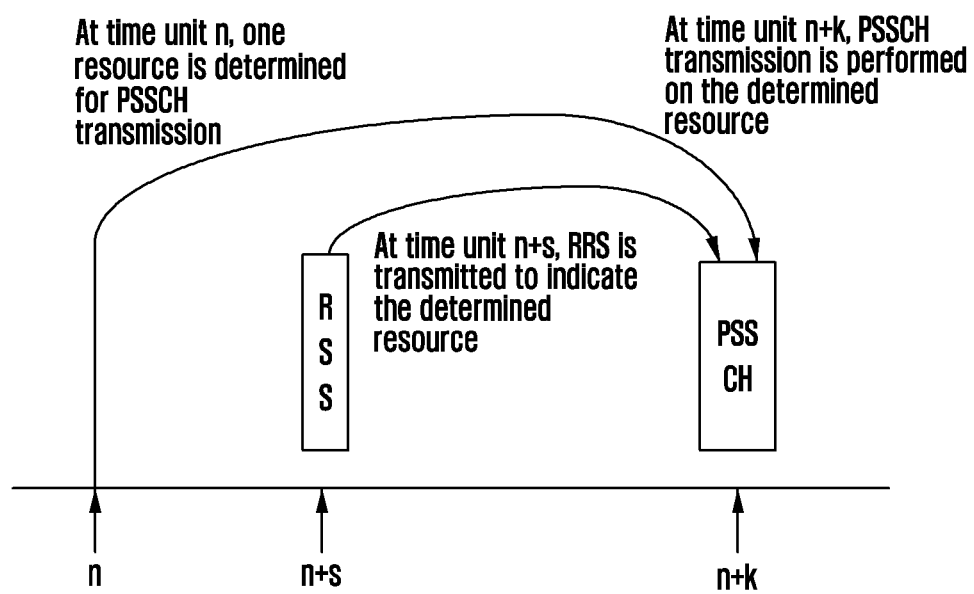
FIG. 2 illustrates a diagram of an example transmission time for a reserved resource signaling according to an embodiment of the disclosure.

FIG. 2 illustrates an example transmission time for the RRS according to an embodiment of the disclosure.

Referring to FIG. 2, the RRS may only indicate one determined PSSCH resource. For example, if the UE determines, at a time unit n, one resource which will be used for data transmission at a time unit n+k, the UE transmits the RRS at a time unit n+s to indicate the determined resource. The transmission time for the RRS must comply with $1 \leq s \leq k-1$, i.e., the RRS must be transmitted prior to the determined PSSCH resource. Here, one time unit contains 14 OFDM symbols or S-FDMA symbols, and the time units mentioned in the application all have such meaning, and the time unit may be referred to as a subframe or a slot in technical standards.

Optionally, s (i.e., the time interval between RRS transmission and the behavior of determining resource) is a fixed value, and s may be a predefined or configurable value, for example, s=1, that is, the UE transmits the RRS at the first time unit immediately following the time unit for determining the resource for PSSCH, or s=2, that is, the UE transmits the RRS at the second time unit immediately following the time unit for determining the resource for PSSCH, and one time unit reserved therebetween is used to prepare for transmitting the RRS.

Optionally, k−s (i.e., the time interval between the RRS transmission and the PSSCH transmission) is a fixed value, and k−s=G may be a predefined or configurable value, that is, the RRS is always transmitted at the $G^{th}$ time unit immediately before the time unit for transmitting the PSSCH, for example, G=10.

Optionally, s (i.e., the time interval between RRS transmission and the behavior of determining resource) is a variable value, but it must satisfy a minimum and/or maximum requirements, i.e., $s \geq s_{min}$ and/or $s \leq s_{max}$, wherein $s_{min}$ and $s_{max}$ may be predefined or configurable values, for example, $s_{min}=2$, that is, the UE should transmit the RRS at or after the second time unit immediately following the time unit for determining the resource for PSSCH, and at least one time unit is reserved therebetween for preparing for RRS transmission, and/or $s_{max}=10$, that is, the UE should transmit the RRS at or before the $10^{th}$ time unit immediately following the time unit for determining the resource for PSSCH.

Optionally, k−s (i.e., the time interval between the RRS transmission and the PSSCH transmission) is a variable value, but k−s=G must satisfy a minimum and/or maximum requirements, i.e., $G \geq G_{min}$ and/or $G \leq G_{max}$, wherein $G_{min}$ and $G_{max}$ may be predefined or configurable values, that is, the UE should transmit the RRS at or after the $G_{max}^{th}$ time unit immediately before the time unit for transmitting the PSSCH, and/or the UE should transmit the RRS at or before the $G_{min}^{th}$ time unit immediately before the time unit for transmitting the PSSCH, for example, $G_{max}=10$, $G_{min}=2$.

Optionally, the UE may transmit the RRS on the earliest ones among all of the available RRS resources that satisfy the preset condition, and if there are a plurality of the earliest available RRS resources, for example, if there are a plurality of available RRS resources in the same time unit, the UE may select any one of the available RRS resources. Here, the preset condition may be $s_{min} \leq s \leq k-1$, $1 \leq s \leq s_{max}$, $s_{min} \leq s \leq s_{max}$, $1 \leq s \leq k-G_{min}$, $k-G_{max} \leq s \leq k-1$ or $k-G_{max} \leq s \leq k-G_{min}$.

Optionally, the UE may arbitrarily select one from all of the available RRS resources that satisfy the preset condition to transmit the RRS. Here, the preset condition may be $s_{min} \leq s \leq k-1$, $1 \leq s \leq s_{max}$, $s_{min} \leq s \leq s_{max}$, $1 \leq s \leq k-G_{min}$, $k-G_{max} \leq s \leq k-1$ or $k-G_{max} \leq s \leq k-G_{min}$.

In another embodiment, the RRS may indicate a plurality of determined PSSCH resources. For example, the UE determines, at a time unit n, $N_{rsrc}$ resources for data transmission at a time unit n+k$_j$ (k$_j$<k$_{j+1}$, j∈(1, N$_{rsrc}$)), then the UE transmits the RRS at a time unit n+s to indicate the determined N$_{rsrc}$ resources, wherein the transmission time for RRS must satisfy 1≤s≤k$_1$−1, that is, the RRS should be transmitted prior to the earliest one of the determined N$_{rsrc}$ resources. The above description of the transmission time for RRS (the value range of s when the RRS only indicates one resource) may be applied to the embodiments of the disclosure.

Figure 3:
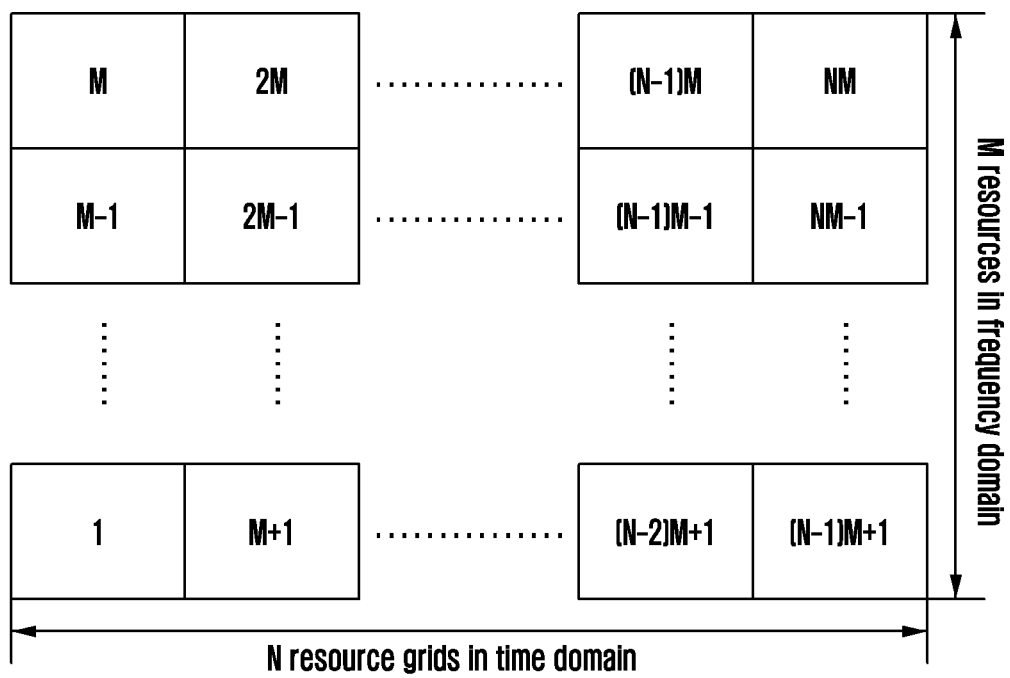
FIG. 3 illustrates a diagram of example resources within one time-frequency window according to an embodiment of the disclosure.

FIG. 3 illustrates a diagram of example resources within one time-frequency window according to an embodiment of the disclosure.

Referring to FIG. 3, the RRS indicates the determined PSSCH resource in an explicit manner, that is, the determined PSSCH resource is indicated by an explicit signaling. For example, the RRS indicates the determined PSSCH resource based on a time-frequency window, and the system may divide the time-frequency window into multiple resource grids. Resource grid is the minimum resource granularity for the PSSCH transmission, i.e., a reference resource. The PSSCH transmission may occupy one or more resource grids, and the RRS indicates the determined PSSCH resource by indicating the positions of one or more resource grids within the time-frequency window. A size of the time-frequency window may be predefined or pre-configured by the system, and a size of the resource grid may also be predefined or pre-configured by the system.

Optionally, the RRS may jointly indicate a time domain position and a frequency domain position of the PSSCH resource, that is, the system jointly encodes time domain position information and frequency domain position information of the resource.

Referring to FIG. 3, the time-frequency window has N$_{time}$ resource grids in the time domain, and N$_{freq}$ resource grids in the frequency domain, that is, the window has N$_{time}$*N$_{freq}$ resource grids in total. Each resource grid is numbered according to a manner of frequency domain first and time domain later, for example, N$_{time}$=50, N$_{freq}$=4, and there are N$_{time}$*N$_{freq}$=200 resource grids in total. 8 bits may be used to indicate the number of any resource grid within the time-frequency window.

Optionally, the RRS may indicate the time domain position and the frequency domain position of the PSSCH resource, respectively, that is, the RRS includes at least two separate indication fields, wherein an indication field for the PSSCH frequency domain position may reuse an indication field for resource assignment in the existing system SA, and an indication field for the PSSCH time domain position may indicate a time interval between the RRS and the PSSCH resource. The maximum time interval between the RRS and the PSSCH resource is predefined or pre-configured.

Optionally, the RRS only indicates the frequency domain position of the PSSCH resource, and the time domain position of the PSSCH resource is obtained in an implicit manner. For example, there is a predefined or pre-configured time interval between the PSSCH resource and the RRS, and the time domain position of the PSSCH resource may be obtained based on the transmission time for the RRS.

Optionally, the RRS only indicates the time domain position of the PSSCH resource, and the frequency domain position of the PSSCH resource is obtained in an implicit manner. For example, there is a one-to-one mapping relationship between the frequency domain position of the PSSCH resource and a frequency domain position of the RRS, and the frequency domain position of the PSSCH resource may be obtained based on the frequency domain position of the RRS.

Optionally, the resource grid is composed of N$_{PRB}$ continuous PRBs of one time unit, wherein N$_{PRB}$ is parameter which is configurable by the system. A configurable value of N$_{PRB}$ is related to a frequency bandwidth of the time-frequency window, and the larger the frequency bandwidth of the time-frequency window, the larger the configurable value of N$_{PRB}$; conversely, the smaller the frequency bandwidth of the time-frequency window, the smaller the configurable value of N$_{PRB}$. For example, the configurable value of N$_{PRB}$ is related to a bandwidth of a carrier bandwidth part (BWP) for the sidelink communication.

Optionally, the resource grid is composed of N$_{TTI}$ continuous time units and N$_{PRB}$ continuous PRBs, wherein N$_{TTI}$ and N$_{PRB}$ are parameters which are configurable by the system. The configurable value of N$_{PRB}$ is related to the frequency bandwidth of the time-frequency window, for example, the configurable value of N$_{PRB}$ is related to the bandwidth of the BWP for the sidelink. When N$_{TTI}$ is configured to be greater than 1, one resource grid may span multiple time units.

Optionally, the PSSCH resource may be composed of multiple resource grids, for example, the PSSCH resource is composed of multiple resource grids which are continuous in the frequency domain, and when indicating the PSSCH resource, the RRS may indicate the number of the resource grids which are continuous in the frequency domain, in addition to the position of the first resource grid in the frequency domain; alternatively, the PSSCH resource is composed of multiple resource grids which are continuous in the time domain, and when indicating the PSSCH resource, the RRS may indicate the number of the resource grids which are continuous in the time domain, in addition to the position of the first resource grid in the time domain; alternatively, the PSSCH resource is composed of multiple resource grids which are continuous in the time domain and multiple resource grids which are continuous in the frequency domain, and when indicating the PSSCH resource, the RRS may indicate the number of the resource grids which are continuous in the time domain and the number of the resource grids which are continuous in the frequency domain, respectively, in addition to the position of the first resource grid in the time domain and that in the frequency domain.

When the PSSCH transmission spans multiple continuous time units (for example, one resource grid spans multiple continuous time units, or one PSSCH resource spans multiple resource grids that are continuous in time), there may be three transmission modes for the PSSCH: the first mode is that the PSSCH is repeatedly transmitted on the multiple time units, that is, the modulated and coded data symbols mapped on each time unit are the same; the second mode is that the multiple time units are aggregated for the PSSCH transmission, that is, a rate matching is performed for PSSCH based on the multiple time units, and the modulated and coded data symbols mapped on each time unit may be different; the third mode is that the PSSCH is transmitted by means of beam sweeping on the multiple time units, that is, the PSSCH is transmitted on the multiple time units by using different beams, wherein the beam here refers specifically to the analog beam, and this transmission mode is suitable for a scene with a high carrier frequency. The PSSCH may support only one of the above transmission modes, or may support multiple modes of the above transmission modes, and may apply any one of the above transmission modes by configuration.

Optionally, the frequency bandwidth of the time-frequency window is predefined. For example, in the 5G New Radio (NR) system, a base station configures the sidelink communication with a BWP, i.e., the sidelink BWP, and the above-mentioned frequency bandwidth of the time-frequency window is the same as the sidelink BWP by default, that is, the RRS indicates the determined PSSCH resource in the entire sidelink BWP.

Optionally, the frequency bandwidth of the time-frequency window is configurable. For example, in the 5G NR system, the base station configures the sidelink communication with a BWP, and the above-mentioned frequency bandwidth of the time-frequency window may be a part of the sidelink BWP, and the frequency bandwidth of the time-frequency window is configured by signaling, that is, the RRS indicates the determined PSSCH resource within a sub-band of the sidelink BWP, and a size of the sub-band is configurable and related to the bandwidth of the sidelink BWP.

Optionally, a time length of the time-frequency window is predefined, for example, the time length of the time-frequency window is the same as the resource selection window of the UE by default. Optionally, the above-mentioned time length of the time-frequency window is configurable, for example, it may be configured to be 20, 50 or 100 time units.

Optionally, the time-frequency window is continuous in time, wherein "continuous" may refer to absolutely continuous without any interval. Optionally, the time-frequency window may be discontinuous in time, because a resource pool configured by the system for the PSSCH may be discontinuous in time, that is, the time-frequency window is not absolutely continuous in time, but is continuous relative to the resource pool for the PSSCH in time.

Optionally, there is a predefined relationship between the transmission time for the RRS and the time domain start position of the time-frequency window, and the time-frequency window starts from the $X^{th}$ time unit following the RRS transmission, wherein X is a predefined by the system, for example, X=2, and one time unit reserved therebetween is used for reception processing of the RRS.

Optionally, the RRS only indicates one PSSCH resource, that is, one RRS corresponds to one PSSCH transmission. In one example, the UE may determine multiple PSSCH resources at one time point, and the multiple PSSCH resources may be discontinuous in time. For example, the UE determines, at time unit n, the PSSCH resource for time unit $n+k_j$, ($k_j<k_{j+1}$, $j\in(1, N_{rsrc})$), since the RRS only indicates one PSSCH resource, the UE needs to transmit $N_{rsrc}$ RRSs so as to indicate $N_{rsrc}$ PSSCH resources, for example, the UE transmits the RRSs at a time unit $n+s_j$ ($s_j<s_{j+1}$, $j\in(1, N)$), and the RRSs indicate corresponding PSSCH resources in an order of time, respectively.

Optionally, the RRS may indicate multiple PSSCH resources, that is, one RRS corresponds to multiple PSSCH transmissions, and the RRS needs to indicate the number of PSSCH resources and the position of each PSSCH resource. The maximum number of the PSSCH resources indicated by the RRS may be predefined or pre-configured. The RRS needs to indicate the time domain position and the frequency domain position for each PSSCH resource. The multiple PSSCH resources indicated by the RRS may be discontinuous in time, and the frequency domain positions thereof may also be different.

The UE may determine multiple PSSCH resources at one time point, and the multiple PSSCH resources may be discontinuous in time. In one example, the multiple PSSCH resources are used for initial transmission and retransmission of the same transport block (TB), that is, the UE should determine at least one PSSCH resource for the initial transmission of one TB, and may also determine one or more PSSCH resources for one or more retransmissions of the TB. The maximum number of retransmissions may be predefined or pre-configured. In another example, the multiple PSSCH resources are used for initial transmission and retransmission of different TBs, that is, the UE determines at least one or more resources for the transmission of one TB, and may further determine one or more PSSCH resources for the transmission of another TB.

Optionally, in addition to the time-frequency domain position of the determined PSSCH resource, the RRS may indicate reservation periods for the PSSCH resource, and the number of reservation periods for the PSSCH resource. For example, the arrival data of the UE is a periodic traffic, and the UE may select resources within $[n+T_1, n+T_2]$ and continuously reserve the selected resource for C periods at the interval $P_A$ for transmitting data that may arrive later. In addition to the time and frequency domain positions of the PSSCH resource, the RRS may indicate the values of $P_A$ and C; alternatively, in addition to the time and frequency domain positions of the PSSCH resource, the RRS may indicate the value of $P_A$, and the value of C is predefined or pre-configured (for example, C is fixed to 1).

In another example, the RRS indicates the determined PSSCH resource in an implicit manner, that is, there is no explicit signaling indication. For example, there is a predefined relationship between the RRS resource and the PSSCH resource, and the predefined relationship may be a one-to-one mapping relationship, that is, the PSSCH resource indicated by the RRS may be determined based on the RRS resource, and the RRS may be carried by a physical layer sequence signal, and as long as the RRS is detected, it is indicated that the PSSCH resource corresponding to the RRS resource is reserved by a certain UE.

In one example, the RRS is transmitted via the direct communication PC5 interface, that is, the RRS is transmitted by one sidelink UE to another sidelink UE, and the RRS transmission and the PSSCH resource indicated by the RRS are based on the same radio link.

Optionally, the RRS is carried by a dedicated physical channel of the PC5 interface, and the physical channel carrying the RRS may be referred to as a Physical Sidelink Resource Reservation Channel (PSRRCH). Similar to the PSCCH carrying the SA, the PSRRCH is transmitted over a physical resource of fixed size using a fixed coding rate and a fixed transmission mode. Operations similar to PSCCH such as channel coding, scrambling, modulation scheme, layer mapping, precoding, and resource mapping and the like may be used. The system may configure available time units for PSRRCH transmissions, as well as positions of available PSRRCH resources within one time unit. The UE should detect whether there is a PSRRCH transmission on every possible PSRRCH resource. The maximum number of PSRRCHs that the UE may detect in one time unit is related to the capabilities of the UE.

Optionally, the RRS is carried by a dedicated physical signal of the PC5 interface, and the physical signal carrying the RRS may be referred to as a Physical Sidelink Resource Reservation Signal (PSRRS). The PSRRS may be implemented by a sequence such as a Pseudo-Noise (PN) sequence, a Zadoff-Chu (ZC) sequence, an M sequence or a Gold sequence and the like. In order to increase the capacity of PSRRS, in addition to supporting multiple orthogonal or quasi-orthogonal sequences, PSRRS may also be multiplexed on the same time-frequency resource using Orthogonal Cover Code (OCC). The PSRRS indicates the determined PSSCH resource in an implicit manner, that is, there is a predefined relationship between the resource used for the PSRRS transmission and the indicated resource, for example, a one-to-one mapping relationship. The resource used for the PSRRS transmission includes a frequency domain resource, a time domain resource, and/or a code domain resource, and the code domain resource may include different sequence IDs or different OCCs for the same sequence.

Optionally, a resource pool for the RRS and a resource pool for the PSCCH/PSSCH may be two different resource pools, and may be separately configured. The resource assignment method for the RRS may be any one of the following approaches:

Approach 1: The UE may select the RRS resource in a deforcement manner. For example, the UE transmits the RRS on the earliest RRS resource. If there are multiple earliest RRS resources, that is, i.e., there are multiple RRS resources in the same time unit, the UE randomly selects one from them. Alternatively, the UE randomly selects one from all of the RRS resources within one time window which is predefined or pre-configured.

Approach 2: The UE may select the RRS resource based on a Listen Before Talk (LBT) manner. For example, the UE may determine whether the RSSI of the first $N_{sym}$ time durations of the RRS resource is lower than a threshold, and if the RSSI is lower than the threshold, the UE considers the RRS resource as idle, and may occupy the remaining time of the RRS resource to transmit the RRS. Wherein, $N_{sym}$ is a value randomly selected by the UE from the range of 1~$N_{sym,max}$, and $N_{sym,max}$ is predefined or pre-configured by the system, and is related to the priority of the UE and/or a priority of the transmitted data traffic; alternatively, $N_{sym}$ is a predefined or pre-configured by the system, and is related to the priority of the UE and/or the priority of the transmitted data traffic. The related detailed description may reuse a LBT method used in determining whether the resource is available as described in FIGS. 5A and 5B.

Approach 3: The UE may use the RRS resource pre-configured by the base station, that is, the resource used by the RRS is pre-configured by the base station via an UU interface. The resource assignment method for the RRS may support only one of the above approaches or multiple approaches of the above approaches, and may use any one of above approaches by configuration.

Optionally, the resource pool used by the RRS and the resource pool used by the PSCCH/PSSCH may be the same resource pool. The resource assignment method for the RRS and that for the PSCCH/PSSCH may be different, for example, the PSCCH/PSSCH transmission uses the resource assignment method autonomously performed by UE, and the RRS transmission uses the resource pre-configured by the base station.

In another example, the RRS is transmitted over a network communication UU interface, that is, the RRS is transmitted by the sidelink UE to the base station via the uplink of the UU interface. In one example, the RRS is only used for In Coverage (IC) UEs of a cellular communication system (e.g., LTE or 5G NR system), and the RRS may not be available for Out Of Coverage (OCC) UEs of the cellular communication system. For example, after the first UE determines the resource for the PSSCH transmission of the PC5 interface by the resource assignment method autonomously performed by UE, the first UE reports the determined PSSCH resource to the base station via the uplink of the UU interface, and the base station informs the second UE of the determined PSSCH resource via the downlink of the UU interface.

In some embodiments, the resource assignment methods of PSSCH for the first UE and the second UE may be or may be not the same.

Optionally, the first UE and the second UE may use the same resource assignment method of PSSCH. For example, both of the first UE and the second UE may use the resource assignment method autonomously performed by UE. The behaviors of the first UE and the second UE may be the same, for example, the second UE should also transmit the corresponding RRS after determining the resource for PSSCH, and the first UE should also receive the RRSs transmitted by other UEs before determining the resource for PSSCH, and determine the resource for PSSCH based on the assistance of received RRSs.

Optionally, the first UE and the second UE may use different resource assignment methods of PSSCH. For example, the first UE may use a resource pre-configured by the base station, and the second UE may use the resource assignment method autonomously performed by UE. Here, the resource assignment method pre-configured by the base station and the resource assignment method autonomously performed by UE may use the same resource pool. The behaviors of the first UE and the second UE may be different. For example, the first UE may only transmit the RRS without receiving the RRSs transmitted by other UEs, and after receiving the resource pre-configured by the base station, the first UE transmits the RRS to indicate the determined PSSCH resource (i.e., the resource configured by the base station). The second UE may determine the resource for PSSCH based on the received RRS information, and may also transmit the corresponding RRS after determining the resource for PSSCH.

The foregoing describes the SA signaling and the RRS, but the SA signaling and the RRS are merely examples of information that may be indicative of information related to the reserved resource of the user equipment, and the disclosure may be implemented in the context of other various signaling, as long as those signaling may indicate information related to the reserved resource.

Hereinafter, the resource assignment method autonomously performed by UE according to embodiments of the disclosure will be described in detail with reference to FIGS. 4A, 4B, 5A and 5B.

The embodiments of FIGS. 4A, 4B, 5A and 5B describe the resource assignment method autonomously performed by UE for the direct communication PC5 interface of the sidelink communication system, and the method excludes resources already reserved by other UEs mainly based on the correctly decoded SA and/or the RRS, and preferably selects the earliest resource in time from the remaining resources for transmitting data. Before transmitting data on the selected resource, it is also necessary to re-evaluate whether the selected resource is available, for example, based on the LBT and/or the correctly decoded SA/RRS. If the selected resource is available, the data is transmitted on the selected resource; if the selected resource is not available, it is determined whether there are other remaining resources; if there are other remaining resources, the earliest resource is re-selected from the other remaining resources for transmitting data, and further evaluate whether the re-selected resource is available; and if there is no other remaining resource, the data is still transmitted on the selected resource.

Figure 4A:
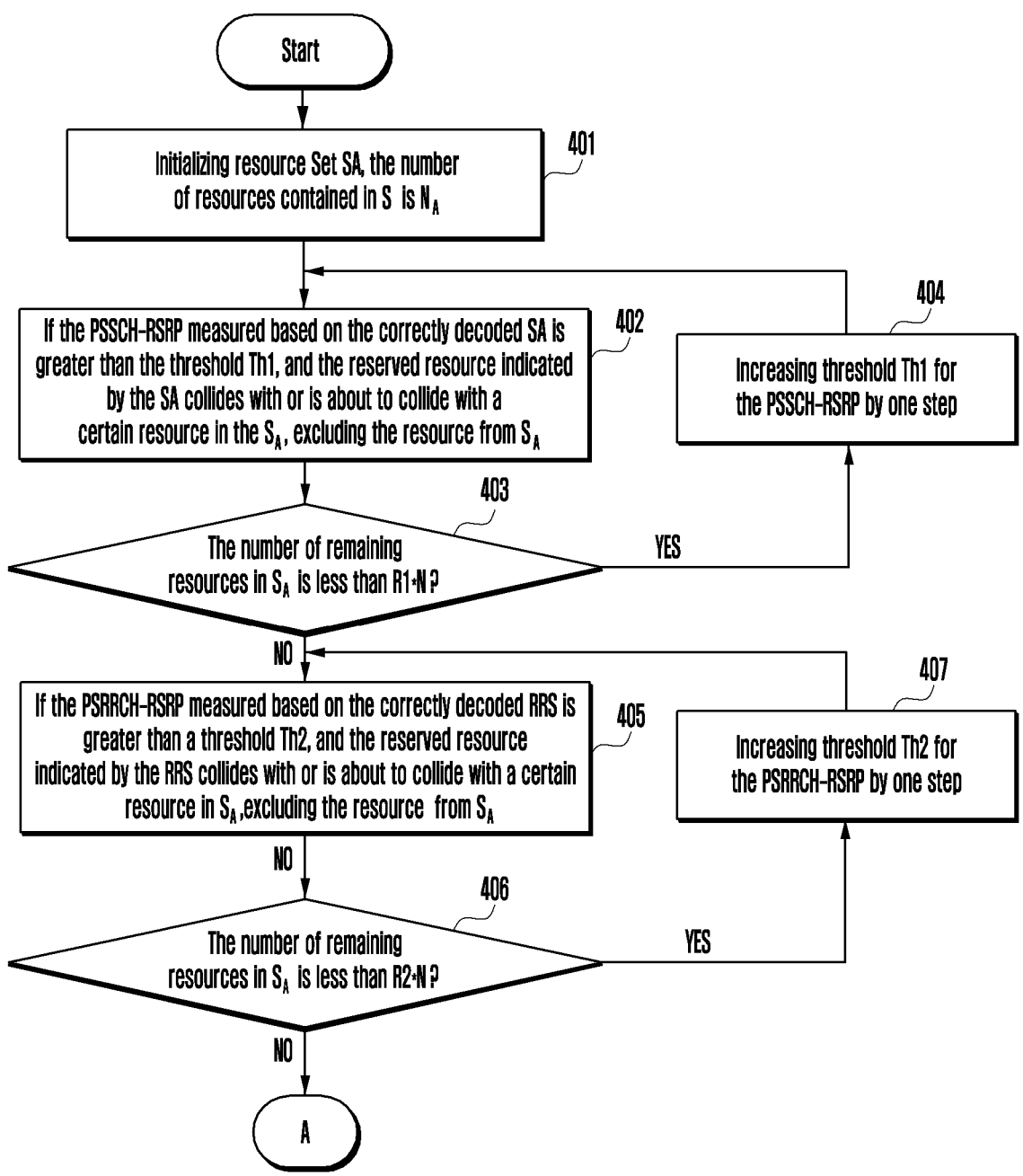
FIGS. 4A and 4B illustrate a flowchart of an autonomous resource assignment method for a UE, according to an embodiment of the disclosure.
Figure 4B:
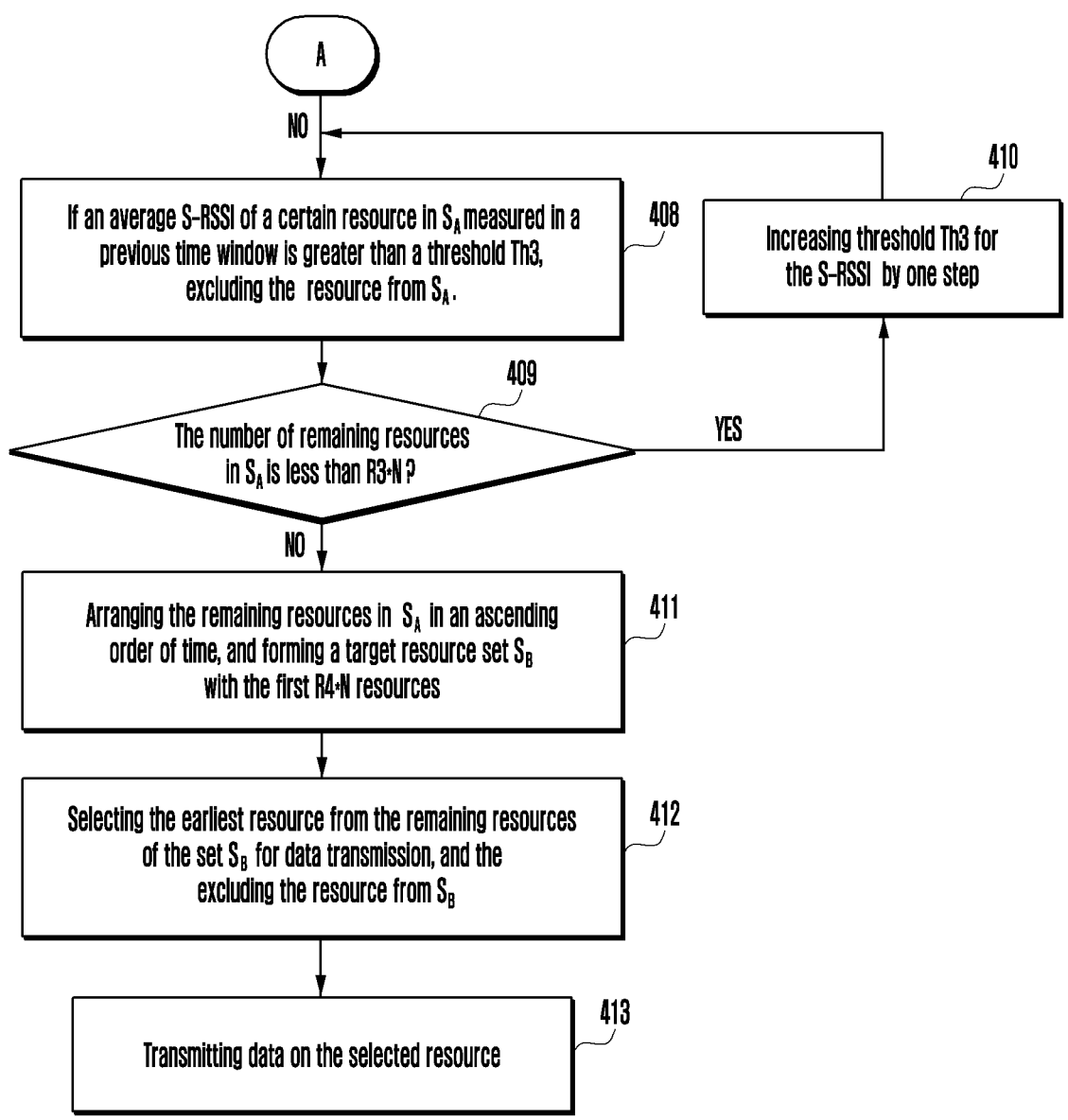

FIGS. 4A and 4B illustrate a flowchart of the resource assignment method autonomously performed by UE according to an embodiment of the disclosure. It should be noted that although FIGS. 4A and 4B describe the resource assignment method autonomously performed by UE in the context of the sidelink communication system and the user equipment, this is merely examples for convenience of description, and the method as described in FIGS. 4A and 4B may be applied to any other suitable type of communication system and device.

Referring to FIGS. 4A and 4B, the resource assignment method autonomously performed by UE may specifically include the following operations:

Operation 401: The UE first initializes a resource set $S_A$ for subsequent resource selection. The number of resources included in $S_A$ is N, that is, the size of the set $S_A$ is N.

The UE initiates the resource selection autonomously performed by UE in the time unit n, and uses all of the resources in the resource selection window [n+$T_1$,n+$T_2$] as the initialized resource set $S_A$ according to a pre-configured resource pool.

Optionally, the values of T1 and T2 are related to latency characteristics of the data traffic of the UE, for example, the values of T1 and T2 may be pre-configured by the base station according to a type of the data traffic of the UE, or may be written in a hard coding manner according to the type of the data traffic of the UE, or may be determined by the UE according to the type of the arrived data traffic.

Optionally, the values of T1 and T2 are randomly selected by the UE from a predefined or pre-configured range, and the ranges of T1 and T2 are related to the latency characteristics of the data traffic of the UE, for example, 1≤T1≤4, and 20≤T2≤100. The ranges of T1 and T2 are pre-configured by the base station according to the data traffic type of the UE, or written in a hard coding manner according to the data traffic type supported by the UE, or determined by the UE according to the type of the arrived data traffic.

Operation 402: For the SA correctly decoded by the UE, the UE should measure the RSRP based on the PSSCH scheduled by the SA (i.e., the PSSCH-RSRP), if the measured PSSCH-RSRP is greater than a threshold Th1, and the reserved resources indicated by the SA collides with or are about to collide with certain resources in the $S_A$, the resources are removed from $S_A$, wherein the reserved resources indicated by the SA include a reserved resource for a next TB transmission (including initial transmission and retransmission) and a reserved resource for current TB retransmissions, and the reserved resource for the next TB transmission and the resource for the current TB transmission are two resources with the same frequency domain and at different time units.

The above-mentioned threshold Th1 for the PSSCH-RSRP is jointly determined based on the priority of the UE performing resource selection and the priority indicated by the correctly decoded SA.

The above-mentioned "about to collide with . . . " means that when the UE continuously reserves a certain resource in the $S_A$ for C periods at the interval $P_A$, the reserved resource indicated by the SA may collide with a certain one among the resources in the C periods reserved by the UE, and the resource that is about to collide with the reserved resource should also be removed from $S_A$. If the data traffic of the UE is non-periodic, the resource determined by the UE is used only once, that is, the determined resource will not be reserved for multiple periods at a certain interval, as a result, such "about to collide with . . . " will not occur.

Operation 403: Whether the number of remaining resources in $S_A$ is less than R1*N is determined, if the number of remaining resources in $S_A$ is less than R1*N, the process proceeds to operation 404 where the threshold for the PSSCH-RSRP is adjusted so that the number of remaining resources in $S_A$ satisfies a preset requirement, and if the number of remaining resources in $S_A$ is not less than R1*N, the process proceeds to operation 405.

Operation 404: The threshold Th1 for the PSSCH-RSRP is increased by one step (for example, Th1 is increased by 3 dB), and the initial value of Th1 and the increased step may be predefined or pre-configured. The UE may repeat operations 402, 403, and 404 until the determination result of operation 403 is "NO", that is, after excluding resources based on the correctly decoded SA, the number of remaining resources in $S_A$ should be at least R1*N.

Operation 405: For the RRS correctly decoded by the UE, the UE shall measure the RSRP of the PSRRCH carrying the RRS (i.e., the PSRRCH-RSRP), if the measured RSRP is greater than a threshold Th2, and the reserved resources indicated by the RRS collide with or are about to collide with a certain resource in $S_A$, the resource is removed from $S_A$.

The above-mentioned threshold Th2 for the PSRRCH-RSRP is determined according to the priority of the UE performing resource selection, or is jointly determined according to the priority of the UE and the priority indicated by the correctly decoded RRS.

The above-mentioned "about to collide with . . . " means that when the UE continuously reserves a certain resource in the $S_A$ for C periods at the interval $P_A$, the reserved resource indicated by the RRS may collide with a certain one among the resources in the C periods reserved by the UE. If the data traffic of the UE is non-periodic, the resource determined by the UE is used only once, that is, the determined resource is not reserved for multiple periods at a certain interval, as a result, such "about to collide with . . . " will not occur.

If the RRS is carried by the PSRRS, the above-mentioned PSRRCH-RSRP may also be referred to as PSRRS-RSRP.

Operation 406: Whether the number of remaining resources in $S_A$ is less than R2*N is determined, and if the number of remaining resources in $S_A$ is less than R2*N, the process proceeds to operation 407 where the threshold for the PSRRCH-RSRP is adjusted so that the number of remaining resources in $S_A$ satisfies the preset requirement, if the number of remaining resources in $S_A$ is not less than R2*N, the process proceeds to operation 408.

Operation 407: The threshold Th2 for the PSRRCH-RSRP is increased by one step (for example, Th2 is increased by 3 dB), and the initial value of Th2 and the increased step may be predefined or pre-configured. The UE may repeat operations 405, 406, and 407 until the determination result of operation 406 is "NO", that is, after excluding resources based on the correctly decoded RRS, the number of remaining resources in $S_A$ should be at least R2*N.

Operation 408: If an average receive signal energy S-RSSI of a certain resource in $S_A$, which is measured in a previous time window, is greater than a threshold Th3, the resource is excluded from $S_A$.

The average receive signal energy S-RSSI of the above-mentioned resource measured in the previous time window refers to an average value of S-RSSIs measured in a plurality of time units periodically appearing in the previous time window at a certain interval. For example, for a resource at the time unit n+k, an average value of S-RSSIs for the resource measured in the time units n+k−T*j is calculated, wherein T is a predefined or pre-configured value (e.g., T=100), j is an integer ranging from 1 to $\text{Num}_{sample}$, $\text{Num}_{sample}$ is the number of measured S-RSSI samples, and is a predefined or pre-configured value (e.g., $\text{Num}_{sample}$=10).

Operation 409: Whether the number of remaining resources in $S_A$ is less than R3*N is determined, and if the number of remaining resources in $S_A$ is less than R3*N, the process proceeds to operation 410 where the threshold for S-RSSI is adjusted so that the number of remaining resources in $S_A$ satisfies the preset requirement, and if the number of remaining resources in $S_A$ is not less than R3*N, the process proceeds to operation 411.

Operation 410: The threshold Th3 for PSRRCH-RSRP is increased by one step (for example, Th3 is increased by 3 dB). The initial value of Th3 and the increased step may be predefined or pre-configured. The UE may repeat operations 408, 409, and 410 until the determination result of operation 409 is "NO", that is, after excluding resources from $S_A$ based on S-RSSI, the number of remaining resources in $S_A$ should be at least R3*N.

Operation 411: The remaining resources in $S_A$ are ordered in an ascending order of time, and the first R4*N resources form the target resource set $S_B$.

Optionally, in the remaining resources in $S_A$, if there are multiple resources in the same time unit, one resource is randomly selected from the multiple resources to form the target resource set $S_B$. That is, the resources of $S_B$ are all located in different time units.

Optionally, in the remaining resources in $S_A$, if there are multiple resources in the same time unit, the multiple resources are arranged in an arbitrary order, or the multiple resources are arranged according to their frequency domain positions, for example, in an order from the lowest to the highest. That is, resources of $S_B$ may be located in the same time unit.

In another embodiment, operation 411 may also be modified as follows: all remaining resources in $S_A$ form the target resource set $S_B$ to ensure that $S_B$ contains as many resource as possible, and the size of the target resource set $S_B$ is equal to the total number of remaining resources in $S_A$. Here, the size of the target resource set $S_B$ is variable, but there is a minimum limitation to the size of the target resource set $S_B$, that is, the minimum value of the size of the target resource set $S_B$ is the minimum value of the number of the remaining resources in $S_A$, which is R3*N at operation 409. Operation 412: Preferably, the earliest resource is selected from the resources of the set $S_B$ for data transmission.

Operation 413: The data is transmitted on the resource selected at operation 412.

The R1*N, R2*N, and R3*N are the minimum values of the number of remaining resources of the initial resource set $S_A$ after excluding resources, R4*N is the size of the target resource set $S_B$, and R1, R2, R3, and R4 are used to ensure that the number of candidate resources contribute certain ratios of the size of the initial resource set $S_A$, i.e., N, which may be ranged from 0 to 1 and may be predefined or pre-configured by the system. When R1*N, R2*N, R3*N, and R4*N are not integers, they should be rounded up or rounded down. Optionally, the R1, R2, R3, and R4 are the same value, that is, R1=R2=R3=R4=R, for example, R=0.2. Optionally, R1, R2, R3, and R4 are different values, and are respectively predefined or pre-configured, and R1≥R2≥R3≥R4. Optionally, the values of R1, R2, R3, and R4 are related to the priority of the data traffic of the UE or a quality of service (QOS), for example, the higher the priority or the QOS, the larger the values of R1, R2, R3, and R4, that is, the larger the minimum valve of remaining resources in $S_A$, and the larger the size of the target resource set $S_B$.

Optionally, in the above resource assignment method, the UE may select multiple resources for initial transmission and retransmissions for one TB, and may also select multiple resources for initial transmissions and retransmissions for multiple TBs, and the maximum Transport Block Size (TBS) supported by the UE is predefined. The maximum TBS may be related to the type of UE and/or the type of data traffic. The UE determines the number of TBs that need to be transmitted according to the maximum TBS and the size of the arrived data, and the larger the size of the arrived data, the larger the number of TBs that need to be transmitted.

Optionally, the UE determines the number of the target resources $\text{Num}_{TB}*(1+\text{Num}_{ret})$ based on the number of TBs that need to be transmitted $\text{Num}_{TB}$ and/or the maximum number of retransmissions for the TB $\text{Num}_{ret}$, and then determines the minimum value of the number of the remaining resources in $S_A$ based on a certain multiple of $\text{Num}_{TB}*(1+\text{Num}_{ret})$, as well as the size of the target resource set $S_B$, for example, the R1*N, R2*N, R3*N, and R4*N are replaced by M1*$\text{Num}_{TB}$*(1+$\text{Num}_{ret}$), M2*$\text{Num}_{TB}$*(1+$\text{Num}_{ret}$), M3*$\text{Num}_{TB}$*((1+$\text{Num}_{ret}$) and M4*$\text{Num}_{TB}$*(1+$\text{Num}_{ret}$), respectively, and M1, M2, M3, and M4 are used to ensure that the number of candidate resources achieve a certain multiple of number of the target resource $\text{Num}_{TB}*(1+\text{Num}_{ret})$, which may be ranged from 0 to 1 and may be predefined or pre-configured by the system. Optionally, M1, M2, M3, and M4 are the same value, that is, M1=M2=M3=M4=M, for example, M=4. Optionally, M1, M2, M3, and M4 are different values, and are respectively predefined or pre-configured, and M1≥M2≥M3≥M4. Optionally, the values of M1, M2, M3, and M4 are related to the priority of the data traffic of the UE or the quality of service (QOS), for example, the higher the priority or the QOS, the larger the values of M1, M2, M3, and M4, that is, the larger the minimum valve of the number of the remaining resources in $S_A$, and the larger the size of the target resource set $S_B$. Optionally, the $\text{Num}_{TB}$ is fixed to be 1. Optionally, the $\text{Num}_{TB}$ is determined by the UE according to the size of the arrived data. Optionally, the $\text{Num}_{ret}$ is fixed to be 1. Optionally, the $\text{Num}_{ret}$ is pre-configured by the system. Optionally, the $\text{Num}_{ret}$ is related to the type of the data traffic, for example, the data traffic that requires a higher QOS, requires a higher transmission reliability, i.e., more number of times for retransmission.

Optionally, the UE jointly determines the minimum value of the number of the remaining resources in $S_A$ and the size of the target resource set $S_B$ based on a certain multiple of the number of the target resources $\text{Num}_{TB}*(1+\text{Num}_{ret})$ and a certain ratio of the size of the initial resource set N. For example, the minimum value of the number of the remaining resources in $S_A$ and the size of the target resource set $S_B$ may be determined by using the maximum value between the certain multiple of the number of the target resources and the certain ratio of the size of the initial resource set, that is, the R1*N, R2*N, R3*N and R4*N are replaced by max (M1*$\text{Num}_{TB}$*(1+$\text{Num}_{ret}$), R1*N), max(M2*$\text{Num}_{TB}$*(1+$\text{Num}_{ret}$), R2*N), max(M3*$\text{Num}_{TB}$*(1+$\text{Num}_{ret}$), R3*N) and max(M4*$\text{Num}_{TB}$*(1+$\text{Num}_{ret}$), R4*N), respectively; alternatively, the minimum value of the number of the remaining resources in $S_A$ and the size of the target resource set $S_B$ may be determined by using the minimum value between the certain multiple of the number of the target resources and the certain ratio of the size of the initial resource set, that is, the R1*N, R2*N, R3*N and R4*N are replaced by min $(M1*Num_{TB}*(1+Num_{ret}), R1*N)$, $\min(M2* Num_{TB}*(1+Num_{ret}), R2*N)$, $\min(M3*Num_{TB}*(1+Num_{ret}), R3*N)$ and $\min(M4*Num_{TB}*(1+Num_{ret}), R4*N)$, respectively.

Optionally, the operations 402-404 may be performed after the operations 405-407, that is, the UE first excludes the resource that has or is about to have a collision from $S_A$ based on the correctly decoded RRS, and then excludes the resource that has or is about to have a collision from $S_A$ based on the correctly decoded SA. Optionally, the operations 402-404 may be omitted, that is, the UE only excludes resource that has or is about to have a collision from $S_A$ based on the correctly decoded RRS.

Optionally, the operations 408-410 may be omitted, that is, the UE excludes resources based on the correctly decoded RRS and the correctly decoded SA. Optionally, operations 405-410 may be omitted, that is, the UE only excludes resources based on the correctly decoded SA.

When the data arrives, the UE performs the resource assignment method autonomously performed by UE of FIGS. 4A and 4B at the time unit n, and determines the resource within the resource selection window $[n+T_1,n+T_2]$ for data transmission according to latency requirements for the data. For example, in a case where the resource for the time unit n+k1 is selected at operation 412, in order to avoid collision with other UEs on the selected resource, and to improve the transmission reliability as much as possible, the UE needs to determine whether the selected resource for the time unit n+k1 has been occupied by other UEs at the time of and/or before the time unit n+k1, that is, the UE cannot directly transmit data on the selected resource for the time unit n+k1, and only when the selected resource for the time unit n+k1 is determined to be available, the UE may transmit data on the selected resource for the time unit n+k1, and when the selected resource for the time unit n+k1 is not determined to be available, the UE may select another resource from the remaining resources of the target resource set $S_B$ for data transmission, and preferably select the earliest resource in time. For example, in a case where the resource for the time unit n+k2 is selected, the UE needs to determine whether the selected resource for the time unit n+k2 is available, at the time of and/or before the time unit n+k2, and if the selected resource for the time unit n+k2 is determined to be available, the UE may transmit data on the selected resource for the time unit n+k2, and if the selected resource for the time unit n+k2 is not determined to be available, the UE may repeat the above operations based on the remaining resources of the target resource set $S_B$ for data transmission, until an available resource is found in the remaining resources of the target resource set $S_B$, and then transmit data on the found available resource; alternatively, if no available resource can be found in the remaining resources of the target resource set $S_B$, the UE may transmit data on the last resource in time in the remaining resources of the target resource set $S_B$.

The operation 413 in FIG. 4B and operation 107 in FIG. 1 may specifically further include transmitting data on the selected resource after the selected resource is determined to be available.

Figure 5A:
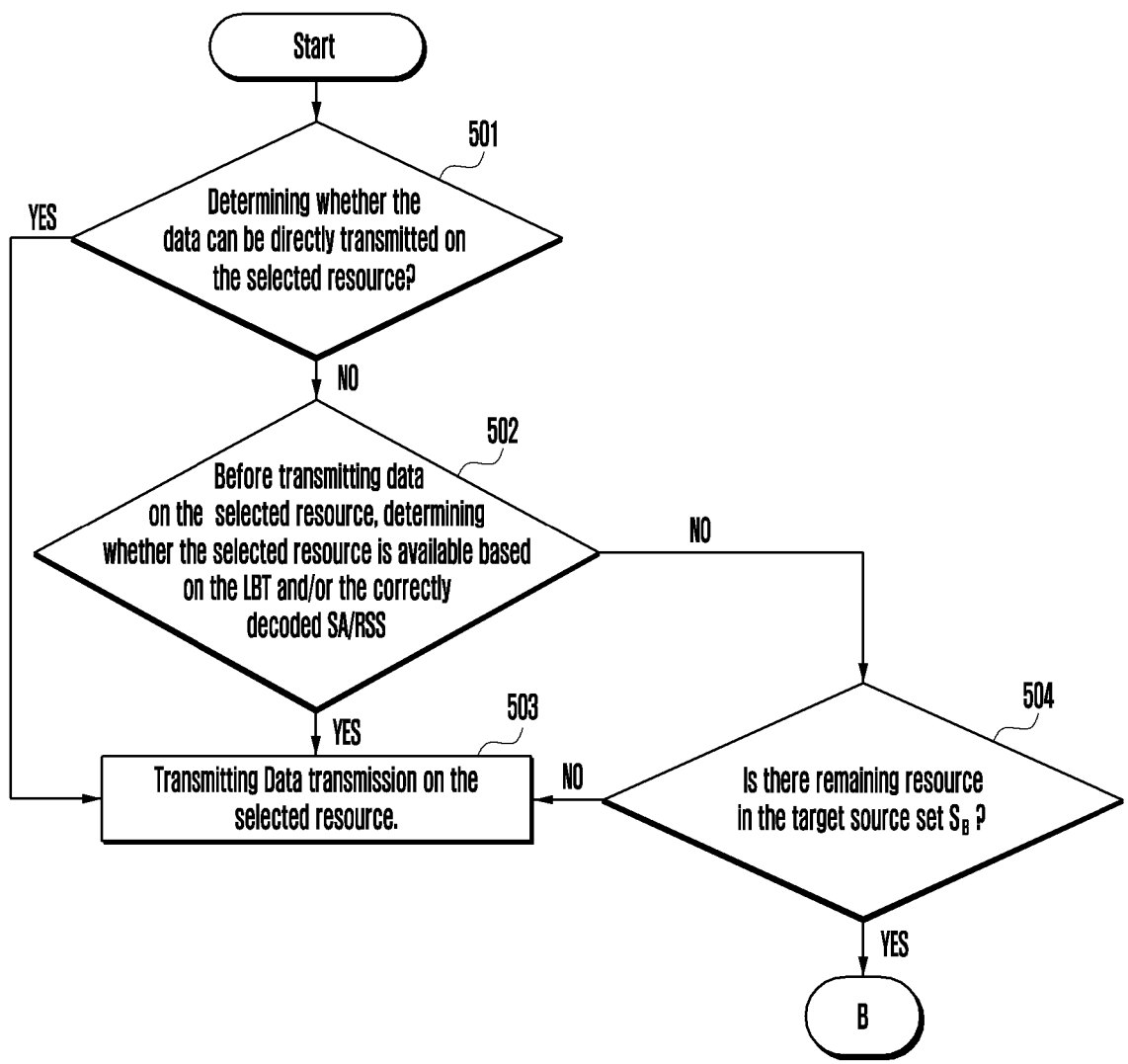
FIGS. 5A and 5B illustrate a flowchart of a method for determining whether a selected resource is available, according to an embodiment of the disclosure.
Figure 5B:
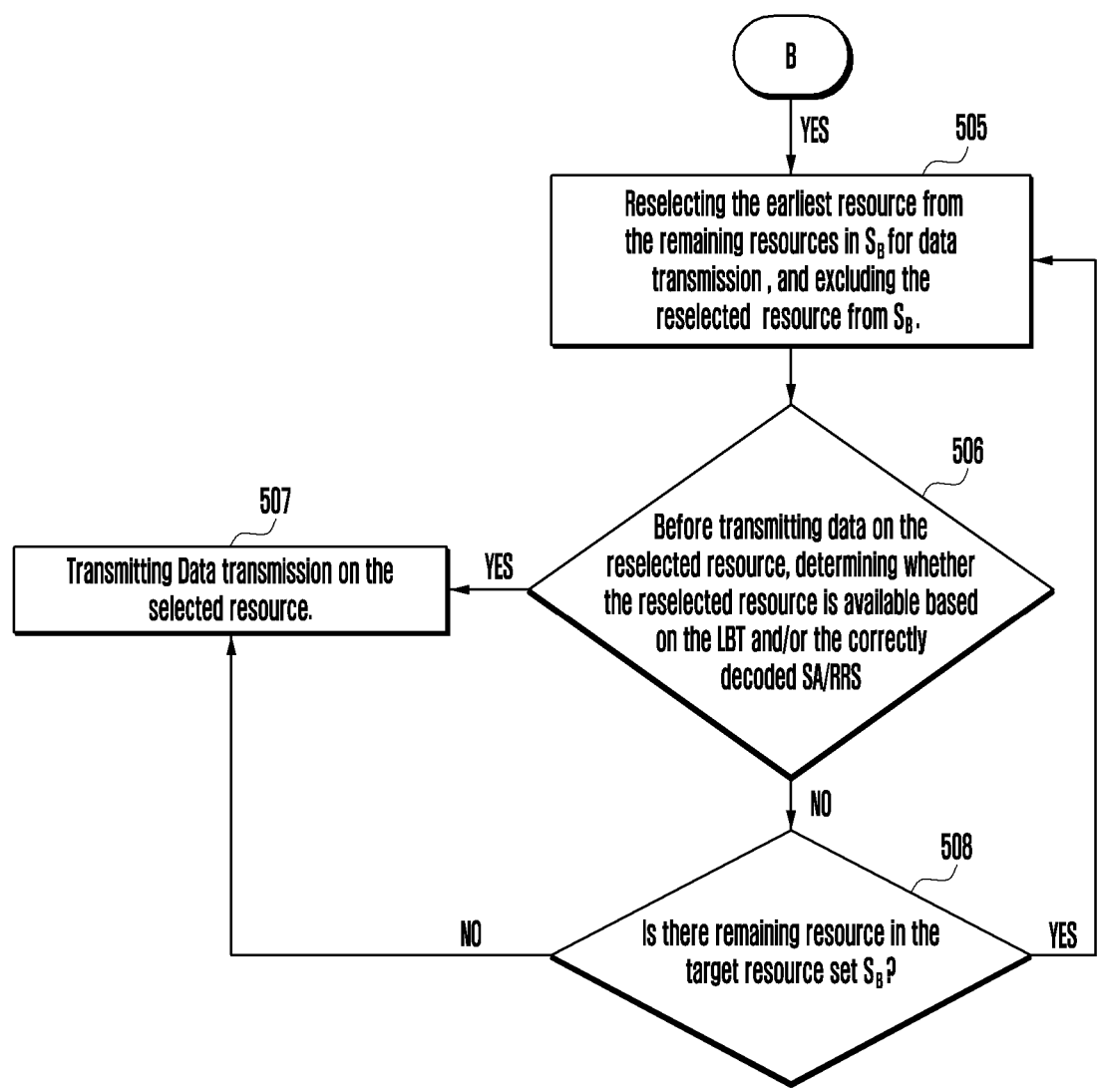

FIGS. 5A and 5B illustrate a flowchart of a method for determining whether a selected resource is available, according to an embodiment of the disclosure. It should be noted that although FIGS. 5A and 5B describe the method for determining whether the selected resource is available in the context of the sidelink communication system and the user equipment, this is merely examples for convenience of description, and the method as described in FIGS. 5A and 5B may be applied to any other suitable type of communication system and device.

Referring to FIGS. 5A and 5B, transmitting data on the selected resource may further include determining whether the selected resource is available. The process is as follows.

Operation 501: The UE determines whether the data can be directly transmitted on the selected resource. If the UE can directly transmit data on the selected resource, the process proceeds to operation 503 where the UE performs data transmission on the selected resource; and if the UE cannot directly transmit data on the selected resource, the process proceeds to operation 502 where whether the selected resource is available is determined.

Optionally, the UE determines whether the data can be directly transmitted on the selected resource, according to whether the UE has transmitted in advance a RRS indicating that the selected resource has been reserved, that is, if the UE has transmitted in advance the RRS indicating that the selected resource has been reserved, the US may directly transmit data on the selected resource; and if the UE does not transmit in advance the RRS indicating that the selected resource has been reserved, the UE cannot directly transmit data on the selected resource. The UE does not transmit in advance the RRS indicating that the selected resource has been reserved due to the following cases:

Case 1: The time interval after the time when the resource is selected and before the time at which the selected resource is located is too short for the UE to transmit the RRS, for example, if the UE determines, at time unit n, the resource for data transmission at time unit n+1, the UE may not have enough time to transmit the RRS;

Case 2: There is no available RRS resource after the time when the UE selects the resource and before the time at which the selected resource is located, for example, in a case where the UE transmits the RRS based on the LBT, no available RRS resource is listened by the UE; alternatively, in a case where the UE transmits the RRS based on the resource pre-configured by the base station, the UE is not configured with available resource during this time interval;

Case 3: Whether the RRS is transmitted is related to the type and priority of the data traffic transmitted by the UE, for example, the UE may transmit the RRS only when the selected resource is used for the data traffic with a high priority, and the UE needs not to transmit the RRS when the selected resource is used for the data traffic with a low priority;

Case 4: Whether the RRS is transmitted is pre-configured by the base station, for example, the UE is not configured by the base station to transmit the RRS.

If there is no RRS to indicate that the selected resource is reserved by the UE, other UEs may not exclude this resource when selecting resource, which may cause collision interference between UEs, the UE thus should determine whether the selected resource has been occupied by other UEs (i.e., whether the selected resource is available) before transmitting data on the selected resource.

Optionally, operation 501 may be omitted, and the UE always performs at operation 502 on the resource selected at operation 412, that is, the UE always determines whether the selected resource is available based on the LBT and/or the correctly decoded SA/RRS before transmitting the data on the selected resource.

Operation 502: The UE determines whether the selected resource is available based on the LBT and/or the correctly decoded SA/RRS before transmitting the data on the selected resource. If the selected resource is determined to be available, the process proceeds to operation 503 where data transmission is performed on the selected resource; and if the selected resource is not determined to be available, the process proceeds to operation 504 where determining whether there is another available resource in $S_B$.

The method for determining whether the selected resource is available may be any one of the following approaches:

Approach 1: Determining whether the selected resource is available based on a LBT criterion.

The UE listens whether all of the RSSIs for the first $Num_{TD}$ (for example, $Num_{TD}$ may be 1) time durations (TDs) within the selected resource are lower than a threshold, and if any one of the RSSIs for the $Num_{TD}$ TDs is higher than the threshold, the selected resource is considered as unavailable, and if the RSSI for each TD of $Num_{TD}$ TDs is lower than the threshold, the resource is considered to be available, and the data is transmitted using the remaining time of the selected resource, and a rate matching is performed to the transmitted TB based on the number of the complete OFDM (or S-FDMA) symbols in the remaining time of the selected resource.

If the remaining time of the selected resource contains an incomplete OFDM (or S-FDMA) symbol, the UE transmits the tail of a signal to be transmitted on the next OFDM (or S-FDMA) symbol over the incomplete OFDM (or S-FDMA) symbol to act as a cyclic prefix; alternatively, the UE transmits an arbitrary signal on the incomplete OFDM (or S-FDMA) symbol to occupy the selected resource.

Optionally, $Num_{TD}$ is a value randomly selected by the UE from the range of 1~$Num_{TD,max}$, where $Num_{TD,max}$ is predefined or pre-configured by the system, and/or $Num_{TD,max}$ is related to the priority of the UE and/or the priority of the data traffic transmitted by the UE, for example, the higher the priority of the UE and/or the priority of the data traffic, the smaller the value of $Num_{TD,max}$; and/or $Num_{TD,max}$ is related to the number of continuous resource grids in time included in the selected resource, e.g., the longer the duration of the selected resource, the larger the value of $Num_{TD,max}$; and/or, $Num_{TD,max}$ is related to a subcarrier interval used in transmitting data, for example, the larger the subcarrier interval, the larger the value of $Num_{TD,max}$.

Optionally, $Num_{TD}$ is predefined or pre-configured by the system, and/or $Num_{TD}$ is related to the priority of the UE and/or the priority of the data traffic transmitted by the UE, for example, the higher the priority of the UE and/or the priority of the data traffic, the smaller the value of $Num_{TD}$; and/or $Num_{TD}$ is related to the number of continuous resource grids in time included in the selected resource, e.g., the longer the duration of the selected resource, the larger the value of $Num_{TD}$; and/or, $Num_{TD}$ is related to a subcarrier interval used in transmitting data, for example, the larger the subcarrier interval, the larger the value of $Num_{TD}$.

Optionally, the duration of the above-mentioned TD is predefined or pre-configured by the system, and is related to the priority of the UE and/or the priority of the data traffic transmitted by the UE, for example, the higher the priority of the UE and/or the priority of the data traffic, the smaller the duration of the TD; and/or the duration of the TD is related to the number of continuous resource grids in time included in the selected resource, e.g., the longer the duration of the selected resource, the larger the duration of the TD; and/or, the duration of the TD is related to a subcarrier interval used in transmitting data, for example, the larger the subcarrier interval, the larger the duration of the TD.

Optionally, the duration of the TD is independent of the duration of a OFDM (or S-FDMA) symbol, that is, the duration of the TD is independent of the subcarrier interval used in transmitting data, for example, the duration of the TD may be 9 us, 16 us or 25 us.

Optionally, the duration of the above-mentioned TD is related to the duration of a OFDM (or S-FDMA) symbol, that is, the duration of the TD is related to the subcarrier interval used in transmitting data, for example, the duration of the TD may be ¼, ½ or 1 OFDM (or S-FDMA) symbol.

Optionally, the $Num_{TD}$ TDs are completely continuous in time.

Optionally, the $Num_{TD}$ TDs may not be continuous in time, for example, there is a predefined time interval between two continuous TDs, and the length of the time interval may be or may not be the same as the length of the TD.

In this approach, the UE determines whether the selected resource is available only at the time at which the selected resource is located.

Approach 2: Determining whether the selected resource is available based on the correctly decoded SA and/or RRS.

For example, for each correctly decoded SA and/or RRS, after the UE performs the resource selection at the time unit n and before the time unit n+k for which the resource is selected, if the reference signal energy RSRP measured based on the PSSCH scheduled by the SA and/or the RSRP measured based on the PSRRCH or PSRRS carrying the RRS is greater than a threshold, the UE should determine whether the reserved resource indicated by the SA and/or the RRS collides with or is about to collide with the selected resource, if so, the selected resource is considered to be unavailable, wherein the threshold for the RSRP for determining whether the selected resource is available is the same as the threshold for the RSRP for excluding the collision resource from $S_B$ as shown in FIGS. 4A and 4B (i.e., the threshold for the RSRP used at operation 407 or 410), that is, the two thresholds may be the same threshold, for example, the threshold for the RSRP newly adjusted at operation 407 (or 410) is used to determine whether the resource is available; alternatively, the two thresholds may be two different thresholds.

In this approach, the UE needs to continuously determine whether the selected resource is available before the time for which the resource is selected, and if the resource has not been determined to be unavailable until one time unit immediately before the selected resource, the selected resource may be used to transmit data.

Approach 3: Determining whether the selected resource is available based on the LBT and the correctly decoded SA and/or RRS, that is, the combination of approaches 1 and 2.

Before the time for which the resource is selected, the UE determines whether the selected resource is available based on each correctly decoded SA and/or RRS (i.e., the approach 2), and if the selected resource has not been determined to be unavailable until one time unit immediately before the selected resource, the UE further determines whether the selected resource is available based on the LBT (i.e., the approach 1), and if the UE listens that the selected resource is available, the data is transmitted on the resource.

If the selected resource is determined to be unavailable, the UE should determine whether there is any other available resource, and the UE may determine it based on the target resource set $S_B$ obtained in determining resources previously. When determining the resources for PSSCH, the UE may first initialize the resource set $S_A$, excludes the resources that may have a collision from the $S_A$ based on the correctly decoded SA and/or RRS, arranges the remaining resources in $S_A$ in an order of time, and finally determines the target resource set $S_B$ (for example, operation 105 of FIG. 1, operation 411 of FIG. 4B). If the selected resource is determined to be unavailable, the UE should reselect another resource from the target resource set $S_B$, and again determine whether the reselected resource is available based on the approaches for determining whether the selected resource is available (i.e., the approaches 1, 2, or 3), and if the reselected resource is determined to be available, the data is transmitted on the reselected resource.

Operation 503: the UE transmits the data on the selected resource.

Operation 504: The UE determines whether there is any remaining resource in the target resource set $S_B$. If there is remaining resource in $S_B$, the process proceeds to operation 505 where one resource is reselected from the remaining resources in $S_B$; if there is no remaining resource in $S_B$, the process proceeds to operation 503 where the data is transmitted on the previously selected resource, even if the previously selected resource is determined to be unavailable.

Operation 505: The UE selects the earliest resource from the remaining resources in $S_B$ for transmitting data, and excludes the resource from $S_B$.

Operation 506: Before transmitting the data on the reselected resource, the UE determines whether the reselected resource is available based on the LBT and/or the correctly decoded SA/RRS, for example, by using any of the approaches 1, 2, and 3. If the reselected resource is determined to be available, the process proceeds to operation 507 where data transmission is performed on the reselected resource; and if the reselected resource is determined to be unavailable, the process proceeds to operation 508 where determining whether there is any other available resources in $S_B$.

Operation 507: Performing the data is transmission on the reselected resource.

Operation 508: Determining whether there is remaining resource in the target resource set $S_B$. That is, the UE may repeat operations 505, 506, 507, and 508 until the available resource is found in $S_B$ or the remaining resources in $S_B$ are traversed, and if the UE finally finds an available resource in $S_B$, the data is transmitted on the available resource, and if no available resource is found after the UE traverses the remaining resources in $S_B$, the data is transmitted on the last resource in $S_B$, even if the last resource is determined to be unavailable.

In summary, the UE may autonomously perform the resource assignment method based on operations shown in FIGS. 4A and 4B in combination with those shown in FIGS. 5A and 5B, that is, the UE may determine a target resource set $S_B$ at the time unit n by using the method described in FIGS. 4A and 4B, and firstly select a resource from $S_B$ which is the earliest and is determined to be available to transmit data by using the method described in FIGS. 5A and 5B, if one resource in $S_B$ is determined to be available, the UE may further select one or more resources from $S_B$ for data transmission (for example, for retransmission of the same TB or for the transmission of the next TB) by using the method as shown in FIGS. 5A and 5B after transmitting data on available resource, that is, the UE may select multiple resources from $S_B$ for actual data transmissions; and if none of the resources in $S_B$ is determined to be available, the data would be transmitted on the last resource in $S_B$, in this case, the UE only determines one resource in $S_B$ for actual data transmission.

Optionally, the UE determines the target resource set $S_B$ at the time unit n by using the method described in FIGS. 4A and 4B, and after the time unit n, for each correctly decoded SA and/or RSS, when the RSRP measured based on the PSSCH scheduled by the SA and/or the RSRP measured based on the physical channel or physical signal carrying the RRS is greater than a threshold, the UE should determine whether the reserved resource indicated by the SA and/or RRS collides with or is about to collide with the resources in $S_B$, and exclude the resources that have or are about to have a collision from $S_B$, and once the number of the remaining resources in $S_B$ reaches the minimum value of the preset sizes of the set $S_B$, the UE should stop the behavior of excluding resources, determine one by one whether each of the remaining resources in $S_B$ is available in the order of time, based on the LBT criterion, and transmit the data on the resource which is determined to be available. The threshold for the RSRP used herein for excluding the resources that have or are about to have a collision from $S_B$ is the same as the threshold for the RSRP newly adjusted at operations 407 or 410.

Optionally, the UE determines the target resource set $S_B$ at the time unit n by using the method in FIGS. 4A and 4B, wherein multiple resources in $S_B$ may be located at the same time unit, for example, N1 (N1≥1) resources in $S_B$ are located at the time unit n+k, and the UE determines whether each of N1 resources for the time unit n+k is available (i.e., the UE determines whether each of N1 resources for the time unit n+k is available by using the LBT criterion and/or the correctly decoded SA/RRS), if N2 (1≤N2≤N1) resources of N1 resources are determined to be available, any one of N2 available resources may be selected for data transmission, and if none of N1 resources is determined to be available, the UE determines other resources available for data transmission based on the remaining resources in $S_B$, and if there is no remaining resource in $S_B$, any of N1 resources which are determined to be unavailable is selected for data transmission.

The UE determines, by using the operations shown in FIGS. 4 and 5, one or more resources in $S_B$ for actual data transmission, and the UE may occupy each of the resources used for actual data transmission only once, or reserve it for multiple periods at a certain interval, and indicate that the corresponding resource is reserved at the certain interval for transmission of the next TB via the SA. If the resource has been indicated in advance to be reserved by the SA, the UE may directly transmit data on the reserved resource indicated by the SA. Before transmitting the data on the reserved resource indicated by the SA, the UE does not need to determine whether the reserved resource indicated by the SA is available.

Optionally, the UE indicates that the resource is reserved at a certain interval for the transmission of the next TB by the SA, and when the interval expires, the UE needs to transmit the PSSCH on the reserved resource indicated by the SA regardless of whether the UE has data to transmit or not, and if the UE has no data to transmit, the UE may transmit a MAC PDU containing 0 MAC SDU on the reserved resource.

Optionally, the UE indicates that the resource is reserved at a certain interval for the transmission of the next TB by the SA, and when the interval expires, if the UE has no data to transmit, it doesn't need to transmit the PSSCH on the reserved resource indicated by the SA. That is, the UE may reserve the resource for data transmission for multiple periods at a certain interval, if the UE has no data to transmit in a certain occasion, it doesn't need to transmit the PSSCH on the reserved resource in the period; and then, if there is new data arrives at the UE, the UE should restart the resource assignment methods of FIGS. 4 and 5 to determine the resource for data transmission; alternatively, the UE may determine whether the reserved resource in the next occasion is available, if the reserved resource in the next occasion is determined to be available, the data can be transmitted on the reserved resource, and if the reserved resource in the next occasion is determined to be unavailable, the UE should restart the resource assignment methods of FIGS. 4 and 5 to determine the resource for data transmission.

Herein, the time unit refers to a Transmission Timer Interval (TTI) of a communication system. In the LTE communication system, the time unit may be referred to as a subframe, and one subframe includes 14 OFDM (SC-FDMA) symbol; in the 5G NR communication system, the time unit may be referred to as a slot, and one slot contains 14 OFDM (or SC-FDMA) symbols, or 7 OFDM (SC-FDMA) symbols.

Figure 6:
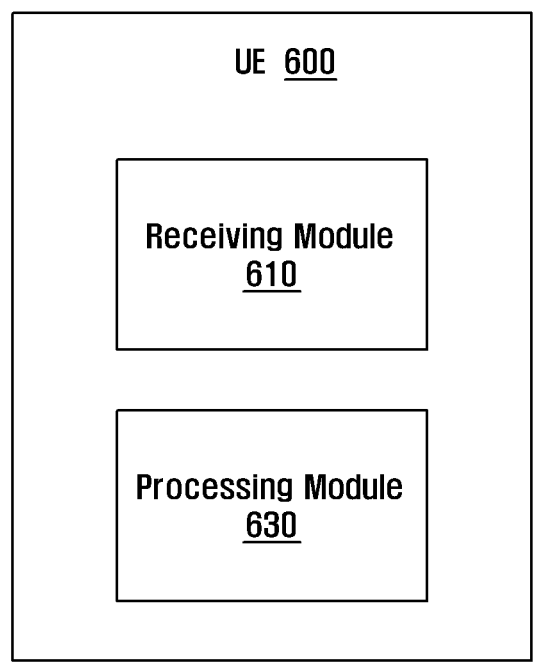
FIG. 6 illustrates a block diagram of a UE according to an embodiment of the disclosure.

FIG. 6 illustrates a UE 600 according to an embodiment of the disclosure.

Referring to FIG. 6, the UE 600 may include a receiving module 610 and a processing module 630. In an embodiment, the receiving module 610 may be configured to receive signaling transmitted by other UEs for indicating reserved resources of the other UEs. In an embodiment, the processing module 630 may be configured to determine the target resource set for data transmission at a first time unit based on the received signaling. The processing module 630 may be further configured to: determine, according to the received signaling, the target resource set for data transmission at the first time unit; select the earliest resource in time from the target resource set, wherein the selected resource is located at a second time unit; determine, at the second time unit and/or between the first time unit and the second time unit, whether the selected resource at the second time unit is available; and determine whether the data is transmitted on the selected resource at the second time unit based on the result of the determination.

Figure 7:
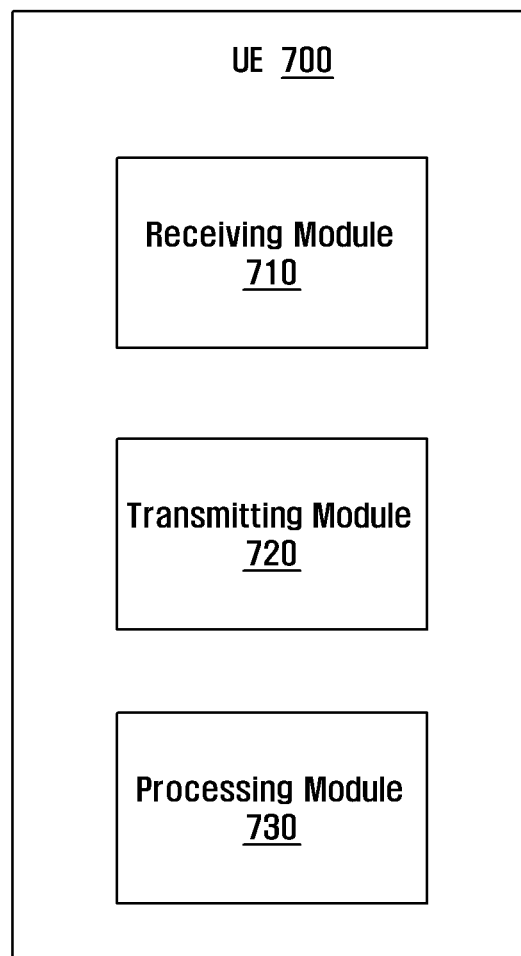
FIG. 7 illustrates a block diagram of a UE according to an embodiment of the disclosure.

FIG. 7 illustrates a UE 700 according to an embodiment of the disclosure.

Referring to FIG. 7, the UE 700 may include a receiving module 710, a transmitting module 720 and a processing module 730. In some embodiments, the receiving module 710 may be configured to receive signaling transmitted by other UEs for indicating reserved resources of the other UEs. The transmitting module 720 may be configured to transmit signaling indicating the reserved resource of the UE to other UEs. The processing module 730 may be configured to: determine, according to the received signaling, the target resource set for data transmission at the first time unit; select the earliest resource in time from the target resource set, wherein the selected resource is located at a second time unit; determine, at the second time unit and/or between the first time unit and the second time unit, whether the selected resource at the second time unit is available; and determine whether the data is transmitted on the selected resource at the second time unit based on the result of the determination.

Figure 8:
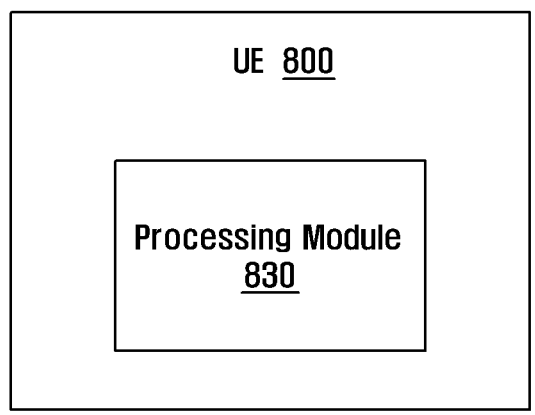
FIG. 8 illustrates a block diagram of a UE according to an embodiment of the disclosure.

FIG. 8 illustrates a UE 800 according to an embodiment of the disclosure.

Referring to FIG. 8, the UE 800 may include a processing module 830. In some embodiment, the processing module 830 may be configured to: determine, according to the received signaling, the target resource set for data transmission at the first time unit; select the earliest resource in time from the target resource set, wherein the selected resource is located at a second time unit; determine, at the second time unit and/or between the first time unit and the second time unit, whether the selected resource at the second time unit is available; and determine whether the data is transmitted on the selected resource at the second time unit based on the result of the determination.

Figure 9:
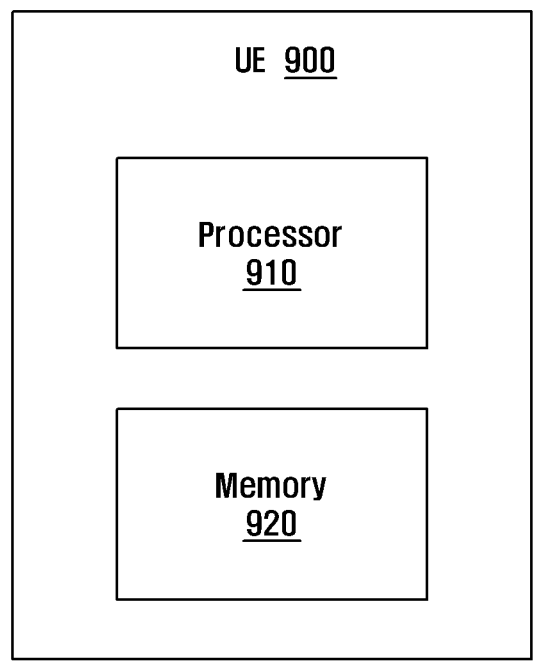
FIG. 9 illustrates a block diagram of a UE according to an embodiment of the disclosure.

FIG. 9 illustrates a UE 900 according to an embodiment of the disclosure.

Referring to FIG. 9, the UE 900 includes a processor 910 and a memory 920. In some embodiments, the memory 920 may be configured to store a machine readable instruction that, when executed by the processor 910, cause the processor to perform methods according embodiments of the disclosure, for example, the methods described with reference to FIGS. 4A, 4B, 5A and 5B.

Those skilled in the art will appreciate that the number and order of flows in flowcharts (e.g., the flowcharts of FIGS. 4A, 4B, 5A and 5B) and/or blocks in block diagrams (e.g., the block diagrams of FIGS. 6 through 9) are merely examples. Depending on specific functionalities, additional flows and/or blocks may be added, and some of the flows and/or blocks shown may be deleted.

Those skilled in the art will appreciate that each block of the structure diagrams and/or block diagrams and/or flow diagrams and combinations of blocks in the structure diagrams and/or block diagrams and/or flow diagrams, may be implemented by computer program instructions. Those skilled in the art will appreciate that these computer program instructions may be provided to a processor of a general purpose computer, special purpose computer, or other programmable data processing device, such that the instructions, when executed via the processor of the computer or other programmable data processing device, implement operations specified in the structure diagrams and/or block diagrams and/or flow diagrams according to the application.

Those skilled in the art should understand that the operations, measures, and schemes in the various operations, methods, and flows that have been discussed in the disclosure may be alternated, modified, combined, or deleted. Further, other operations, measures, and schemes of the various operations, methods, and flows that have been discussed in the disclosure may be alternated, modified, rearranged, decomposed, combined, or deleted. Further, the operations, measures, and schemes of the various operations, methods, and flows disclosed in the prior art may also be alternated, modified, rearranged, decomposed, combined, or deleted.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a terminal in a wireless communication system, the method comprising following steps of:
   receiving, from a base station, a message including configuration information on a resource pool for sidelink communication;
   initializing a set of resources with all resources based on the configuration information;
   determining the set of resources by excluding a resource from the set of resources with all resources based on a reference signal received power (RSRP) measured for the resource being higher than a threshold;
   transmitting, to the base station, a report for the determined set of resources; and
   re-evaluating the resource, wherein the step of the determining of the set of the resources further comprising followings steps of:
identifying whether a number of remaining resources in the determined set of resources is smaller than a predetermined value,
in case that the number of the remaining resources is smaller than the predetermined value, increasing the threshold and continuing with the step of the initializing of the set of resources, and
in case that the number of the remaining resources is not smaller than the predetermined value, performing the step of the transmitting of the report.

2. The method of claim 1,
wherein the predetermined value is determined based on information on a portion of resources in the determined set of resources over the all resources, and
wherein the information is determined based on a priority for a physical sidelink shared channel (PSSCH) transmission.

3. The method of claim 1,
wherein a physical sidelink shared channel (PSSCH) transmission is performed based on a result of the re-evaluation, and
wherein the threshold is determined based on a first priority for the PSSCH transmission and a second priority indicated by a PSSCH scheduling signaling.

4. The method of claim 3,
wherein the PSSCH transmission is performed on the resource, in case that the resource is identified to be available based on the re-evaluation, and
wherein the PSSCH transmission is performed on another resource included in the determined second set of the resources, in case that the resource is identified to be unavailable based on the re-evaluation.

5. A terminal in a wireless communication system, the terminal comprising:
a transceiver; and
a processor configured to:
control the transceiver to receive, from a base station, a message including configuration information on a resource pool for sidelink communication,
identify a set of resources with all resources based on the configuration information,
determine the set of resources by excluding a resource from the set of resources with all resources based on a reference signal received power (RSRP) measured for the resource being higher than a threshold,
control the transceiver to transmit, to the base station, a report for the determined set of resources, and
re-evaluate the resource,
wherein the processor is further configured to perform the steps of the determination of the set of resources by the following steps of:
identification of whether a number of remaining resources in the determined set of resources is smaller than a predetermined value,
in case that the number of the remaining resources is smaller than the predetermined value, increase the threshold and continuing with the step of the identification of the set of resources, and
in case that the number of the remaining resources is not smaller than the predetermined value, perform the step of the control of the transceiver to transmit the report.

6. The terminal of claim 5,
wherein the predetermined value is determined based on information on a portion of resources in the determined set of resources over the all resources, and
wherein the information is determined based on a priority for a physical sidelink shared channel (PSSCH) transmission.

7. The terminal of claim 5,
wherein a physical sidelink shared channel (PSSCH) transmission is performed based on a result of the re-evaluation, and
wherein the threshold is determined based on a first priority for the PSSCH transmission and a second priority indicated by a PSSCH scheduling signaling.

8. The terminal of claim 7, wherein the controller is further configured to:
perform the PSSCH transmission on the resource, in case that the resource is identified to be available based on the re-evaluation; and
perform the PSSCH transmission on another resource included in the determined set of the resources, in case that the resource is identified to be unavailable based on the re-evaluation.

9. A method performed by a base station in a wireless communication system, the method comprising:
transmitting, to a terminal, a message including configuration information on a resource pool for sidelink communication, wherein a set of resources with all resources is initialized based on the configuration information; and
receiving, from the terminal, a report for a set of resources, wherein the set of resources for the report is determined based on the initialized set of resources,
wherein, in case that a reference signal received power (RSRP) measured for a resource is higher than a threshold or an increased threshold, the set of the resources for the report is determined based on an exclusion of the resource from the initialized set of resources, and
wherein, in case that a number of remaining resources in the initialized set of resources is smaller than a predetermined value, the increased threshold is applied to determine the set of resources for the report, and
wherein the resource is re-evaluated by the terminal.

10. The method of claim 9,
wherein the predetermined value is determined based on information on a portion of resources in the initialized set of resources excluded the resource over the all resources, and
wherein the information is determined based on a priority for a physical sidelink shared channel (PSSCH) transmission.

11. The method of claim 9,
wherein a physical sidelink shared channel (PSSCH) transmission is performed based on a result of the re-evaluation, and
wherein the threshold is determined based on a first priority for the PSSCH transmission and a second priority indicated by a PSSCH scheduling signaling.

12. The method of claim 11,
wherein the PSSCH transmission is performed on the resource, in case that the resource is available based on the re-evaluation, and
wherein the PSSCH transmission is performed on another resource included in the set of resources for the report, in case that the resource is unavailable based on the re-evaluation.

13. A base station in a wireless communication system, the base station comprising:
- a transceiver; and
- a controller configured to:
    - control the transceiver to transmit, to a terminal, a message including configuration information on a resource pool for sidelink communication,
- wherein a set of resources with all resources is initialized based on the configuration information, and
    - control the transceiver to receive, from the terminal, a report for a set of resources, wherein the set of resources for the report is determined based on the initialized set of resources,
- wherein, in case that a reference signal received power (RSRP) measured for a resource is higher than a threshold or an increased threshold, the set of the resources for the report is determined based on an exclusion of the resource from the initialized set of resources, and
- wherein, in case that a number of remaining resources in the initialized set of resources is smaller than a predetermined value, the increased threshold is applied to determine the set of resources for the report, and
- wherein the resource is re-evaluated by the terminal.

14. The base station of claim 13,
- wherein the predetermined value is determined based on information on a portion of resources in the initialized set of resources excluded the resource over the all resources,
- wherein the information is determined based on a priority for a physical sidelink shared channel (PSSCH) transmission, and
- wherein the threshold is determined based on a first priority for the PSSCH transmission and a second priority indicated by a PSSCH scheduling signaling.

15. The base station of claim 13,
- wherein the PSSCH transmission is performed on the resource, in case that the resource is available based on the re-evaluation, and
- wherein the PSSCH transmission is performed on another resource included in the set of resources for the report, in case that the resource is unavailable based on the re-evaluation.

* * * * *